United States Patent
Knight et al.

(10) Patent No.: US 11,460,982 B1
(45) Date of Patent: Oct. 4, 2022

(54) NUMBER EMBEDDING APPLICATION SYSTEM

(71) Applicant: BEIJING DIDI INFINITY TECHNOLOGY AND DEVELOPMENT CO., LTD., Beijing (CN)

(72) Inventors: Kevin Knight, Los Angeles, CA (US); Mariia Ryskina, Pittsburgh, PA (US)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 136 days.

(21) Appl. No.: 17/133,211

(22) Filed: Dec. 23, 2020

(51) Int. Cl.
| | |
|---|---|
| *G06F 17/16* | (2006.01) |
| *G06F 3/0484* | (2022.01) |
| *G06N 5/04* | (2006.01) |
| *G06N 20/00* | (2019.01) |

(52) U.S. Cl.
CPC ............ *G06F 3/0484* (2013.01); *G06F 17/16* (2013.01); *G06N 5/04* (2013.01); *G06N 20/00* (2019.01)

(58) Field of Classification Search
CPC ...................................................... G06F 17/16
See application file for complete search history.

(56) References Cited

U.S. PATENT DOCUMENTS

| | | | |
|---|---|---|---|
| 2013/0318500 A1* | 11/2013 | Eker | .................... G06F 11/3664 717/125 |
| 2020/0065444 A1* | 2/2020 | Bullock | ................ G06F 30/367 |
| 2022/0129248 A1* | 4/2022 | Kim | ......................... G06F 7/58 |

* cited by examiner

*Primary Examiner* — Di Xiao
(74) *Attorney, Agent, or Firm* — Knobbe, Martens, Olson & Bear, LLP

(57) ABSTRACT

Systems and methods are provided for using encoded representations of numbers in various applications. The encoded representations of numbers, also referred to as number embeddings, may be multi-element data structures (e.g., multi-dimensional vectors) in which each element is a real-numbered value. The values of a given number embedding collectively encode information from which properties of the number represented by the number embedding may be derived. Number embeddings may be compared or otherwise analyzed with respect to each other to identify patterns or similarities in the numbers represented by each number embedding.

20 Claims, 9 Drawing Sheets

NUMBER EMBEDDING APPLICATION SYSTEM

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network. Artificial neural networks are artificial in the sense that they are computational entities, analogous to biological neural networks, but implemented by computing devices. Output of neural-network-based models, typically in the form of a score, is obtained by doing a "forward pass." The forward pass involves multiplying large neural network weight matrices, representing the parameters of the model, by vectors corresponding to input vectors or hidden intermediate representations, as well as performing other mathematical operations. The parameters of a neural network can be set in a process referred to as training.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect includes systems, methods, and/or non-transitory computer-readable media that provide features for generation of number embeddings. The features include: obtaining number sequence data representing one or more sequences of numbers; training a number prediction machine learning model using the number sequence data, wherein the number prediction machine learning model generates output representing a next number in a number sequence based at least partly on input representing a number in the number sequence; obtaining, from the number prediction machine learning model, internal representation data associated with a set of numbers, wherein a first portion of the internal representation data comprises an internal representation of the number prediction machine learning model generated based at least partly on a first number of the set of numbers; and generating a plurality of number embeddings from the internal representation data, wherein a number embedding of the plurality of number embeddings comprises a multi-element representation of the first number.

Another aspect includes systems, methods, and/or non-transitory computer-readable media that provide features for probing number embeddings. The features include: obtaining a set of number embeddings corresponding to a set of numbers, wherein a number embedding of the set of number embeddings comprises a multi-element representation of a number of the set of numbers; generating first probe results based at least partly on classification of a first subset of elements of individual number embeddings of the set of number embeddings into one or more numeric property classifications using a first machine learning probe; generating second probe results based at least partly on classification of a second subset of elements of individual number embeddings of the set of number embeddings into the one or more numeric property classifications using a second machine learning probe; and selecting the first machine learning probe based at least partly on an analysis of the first probe results with respect to the second probe results.

A further aspect includes systems, methods, and/or non-transitory computer-readable media that provide features for evaluation of expressions and other numeric analysis and generation tasks using number embeddings. The features include: receiving, from a computing device, a request to perform an operation with respect to a plurality of numbers; determining a similarity metric using at least a first number embedding and a second number embedding of a plurality of number embeddings, wherein each number embedding of a subset of the plurality of number embeddings comprises a multi-element representation of a corresponding number of the plurality of numbers; identifying a third number embedding of the plurality of number embeddings based at least partly on the similarity metric and the operation; and generating a response to the request, the response comprising at least a number corresponding to the third number embedding.

DETAILED DESCRIPTION

Figure 1:
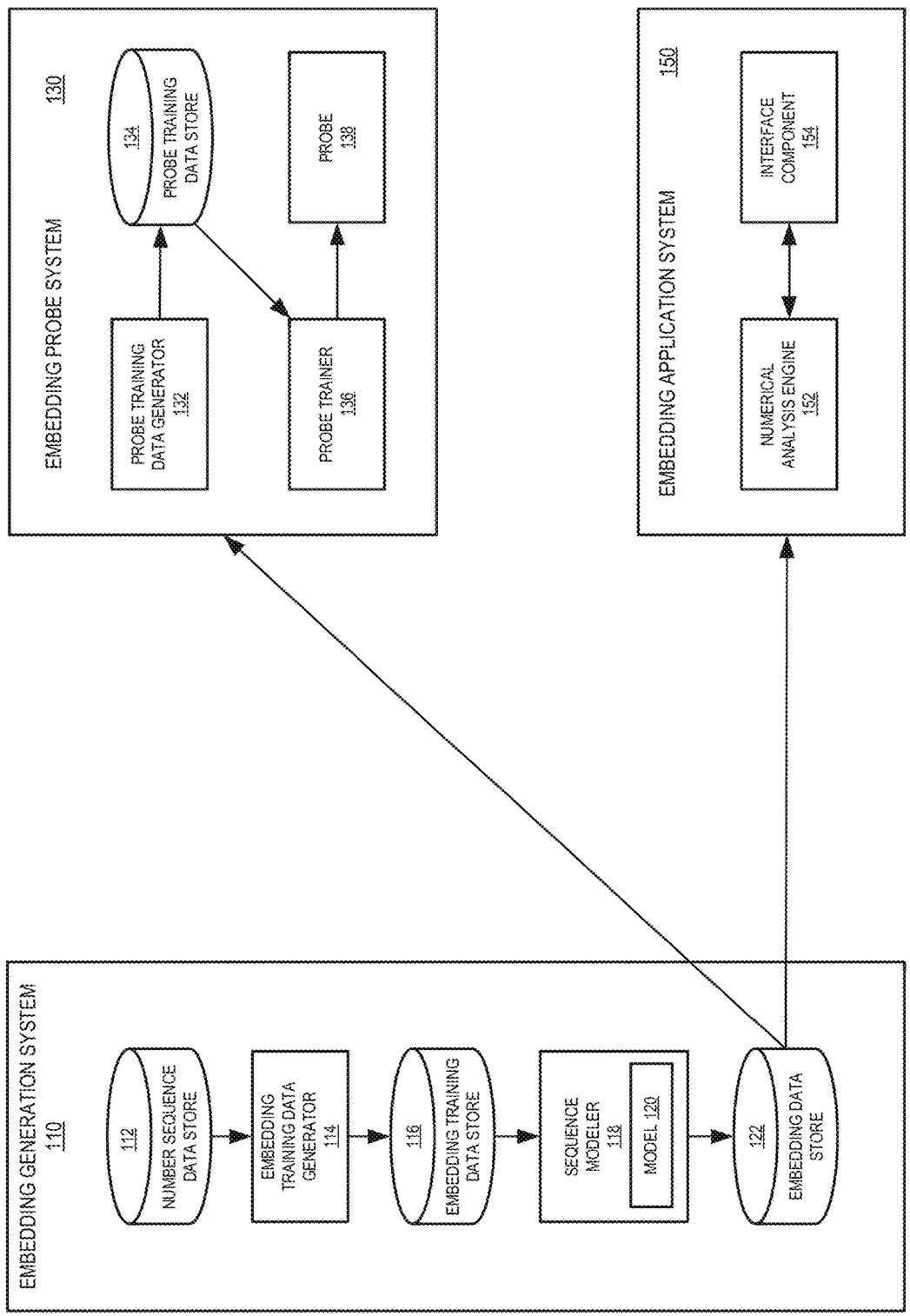
FIG. 1 illustrates a block diagram of a computing environment in which number embeddings are generated, analyzed, and used, according to certain aspects of the present disclosure.

The present disclosure is directed to generating, analyzing, and using encoded representations of numbers in various applications. The encoded representations of numbers, referred to herein as number embeddings, may be multi-element data structures (e.g., multi-dimensional vectors) in which each element is a real-numbered value. The values of a given number embedding collectively encode information from which properties of the number represented by the number embedding may be derived. For example, machine learning-based probes may be used to identify properties of the individual numbers represented by each number embedding. As another example, number embeddings may be compared or otherwise analyzed with respect to each other to identify patterns or similarities in the numbers represented by each number embedding. Thus, the number embeddings facilitate the effective discovery, analysis, and application of properties of numbers in a manner not previously possible.

Some conventional numerical analysis systems rely upon preprogrammed rules or approximation techniques to analyze and otherwise work with numbers. For example, numbers may be analyzed and manipulated using known, preprogrammed properties of the numbers. As another example, mathematical problems may be analyzed using pre-programmed rules for comparison and calculation according to known properties, patterns, and the like. Such conventional systems are not easily adaptable to new numerical properties and/or new applications, but rather require changes to the rules and algorithms themselves. Moreover, because the properties, relationships, and methods of analysis of the numbers are preprogrammed, they must be known ahead of time. Thus, discovery of new relationships, properties, and the like are difficult or impossible with such conventional systems.

Aspects of the present disclosure address the issues discussed above, among others, by generating number embeddings that may be analyzed and used in various applications. A number embedding generation system may generate different number embeddings for each number of a set of numbers. In some embodiments, number embeddings may be generated for each integer in a particular range, such as m to n, where m is the lower bound of the range and n is the upper bound of the range. To generate the number embeddings, the number embedding generation system may obtain data regarding sequences of numbers, such as an ordered list of prime numbers, a Fibonacci sequence, and the like. The system may use the sequences to train a machine learning model to make predictions (e.g., given one or more input numbers, predict the next number in a sequence). By training the model in this manner, the model parameters will take on values that relate to the sequences of numbers in various ways. For example, the model may be an artificial neural network, in which a hidden layer is associated with a set of weights that are applied to input in order to produce an encoded internal representation of the input. Thus, the weights represent at least a portion of what the model has learned about the number sequences during training. The weights (or data derived therefrom) may be extracted from the neural network as the number embeddings.

Additional aspects of the present disclosure relate to analyzing the number embeddings to identify properties of the numbers represented by the number embeddings. The analysis may be performed using probes that analyze portions of the number embeddings (e.g., subsets of values that make up individual number embeddings). In some embodiments, probe training data may be generated by labeling a subset of number embeddings with various properties of the numbers to which the number embeddings correspond (e.g., odd/even, prime/not prime, order of magnitude, divisibility by a given number x, etc.). A probe may be trained, using the training data, to help identify numbers having particular properties based on the embeddings of those numbers. Once trained, such probes may then be used to identify numbers that have particular properties even in cases where the properties of the numbers are not known in advance.

Further aspects of the present disclosure relate to using number embeddings in various numerical applications. In some embodiments, two or more number embeddings may be compared or otherwise analyzed with respect to each other to determine similarities and/or differences, such as similarities and/or differences in subsets of elements of the number embeddings, distances and/or orientations in multi-dimensional space, or the like. Based on these identified similarities and/or differences, other numbers may be identified. For example, other numbers may be identified that are similar to a given set of numbers, even if the manner in which the numbers are similar is not previously known or able to be expressed in terms of predefined numeric properties. Such identifications may be used in analogy tasks, set completion tasks, sequence prediction tasks, or the like. Moreover, the number embeddings and analyses thereof may be used in practical applications, such as identification of fraudulent or anomalous data, performing complex calculations, and the like.

Detailed descriptions and examples of systems and methods according to one or more illustrative embodiments of the present disclosure may be found, at least, in the section entitled Generation and Use of Number Embeddings, as well as in the section entitled Example Embodiments, and also in FIGS. 2-9 herein. Furthermore, components and functionality for generation and use of number embeddings may be provided by or implemented within the computing environment 100 described herein in FIG. 1.

Various embodiments described herein are intimately tied to, enabled by, and would not exist except for computer technology. For example, the number embedding generation and analysis featured described herein in reference to various embodiments cannot reasonably be performed by humans alone, without the computer technology upon which they are implemented.

Architecture for Generation and Use of Number Embeddings

FIG. 1 depicts an illustrative computing environment 100 in which aspects of the present disclosure may be implemented. In some embodiments, as shown, the computing environment 100 may include an embedding generation system 110 to generate number embeddings, an embedding probe system 130 to probe number embeddings, and an embedding application system 150 to use number embeddings in various applications.

The systems and other components of the computing environment 100 may communicate with each via one or more communications networks, such as wired and/or wireless communication networks. The networks may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs"), and/or any combination, permutation, and/or aggregation thereof.

The embedding generation system 110 may include various components that provide functionality for generating and maintaining number embeddings. In some embodiments, the embedding generation system 110 may include a number sequence data store 112 that stores a corpus of number sequences data from which number embeddings may be generated. For example, the corpus of number sequence data may include data representing one or more listings of number sequences, such as a sequence of counting numbers, a sequence of prime numbers, a Fibonacci sequence of numbers, a sequence of perfect square numbers, Recamán's number sequence, a Catalan number sequence, other number sequences, or some combination thereof. The embedding generation system 110 may also include an embedding training data generator 114 to generate training data, using the number sequence data, from which a machine learning model may be trained. The embedding generation system 110 may also include an embedding training data store 116 to store the embedding training data generated by the embedding training data generator 114. The embedding generation system 110 may also include a sequence modeler 118 that may use the embedding training data to train a machine learning model 120 from which number embeddings may be derived. The embedding generation system 110 may also include an embedding data store 122 to store number embeddings and, in some cases, metadata or other related data.

The embedding probe system 130 may include various components that provide functionality for probing or otherwise analyzing number embeddings to determine properties of the numbers represented by the number embeddings. In some embodiments, the embedding probe system 130 may include a probe training data generator 132 to generate training data, using number embeddings such as those generated by the embedding generation system 110, from which a number embedding probe may be trained. The embedding probe system 130 may also include a probe training data store 134 to store the probe training data generated by the probe training data generator 132. The embedding probe system 130 may also include a probe trainer 136 to train one or more probes 138 using the probe training data.

The embedding application system 150 may include various components that provide functionality for analyzing or otherwise applying number embeddings to solve numerical problems. In some embodiments, the embedding application system 150 may include a numerical analysis engine 152 to perform various numerical analysis tasks using number embeddings, such as those generated by the embedding generation system 110. The embedding application system 150 may also include an interface component 154 to manage input and output to/from other systems that may use the number embedding analysis services provided by the embedding application system 150.

The embedding generation system 110, embedding probe system 130, and/or embedding application system 150 may be implemented on one or more physical server computing devices that provide computing services and resources. In some embodiments, the embedding generation system 110, embedding probe system 130, and embedding application system 150 (or individual components thereof, such as the embedding training generator 114, sequence modeler 118, probing training data generator 132, probe trainer 136, numerical analysis engine 152, interface component 154, etc.) may be implemented on one or more host devices, such as blade servers, midrange computing devices, mainframe computers, desktop computers, or any other computing device configured to provide computing services and resources. For example, a single host device may execute one or more components of an embedding generation system 110, embedding probe system 130, and/or embedding application system 150, some combination thereof, etc. The computing environment 100 may include any number of such hosts.

In some embodiments, the features and services provided by the embedding generation system 110, embedding probe system 130, and/or embedding application system 150 may be implemented as web services consumable via one or more communication networks. In further embodiments, the computing environment 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Generation and Use of Number Embeddings

Figure 2:
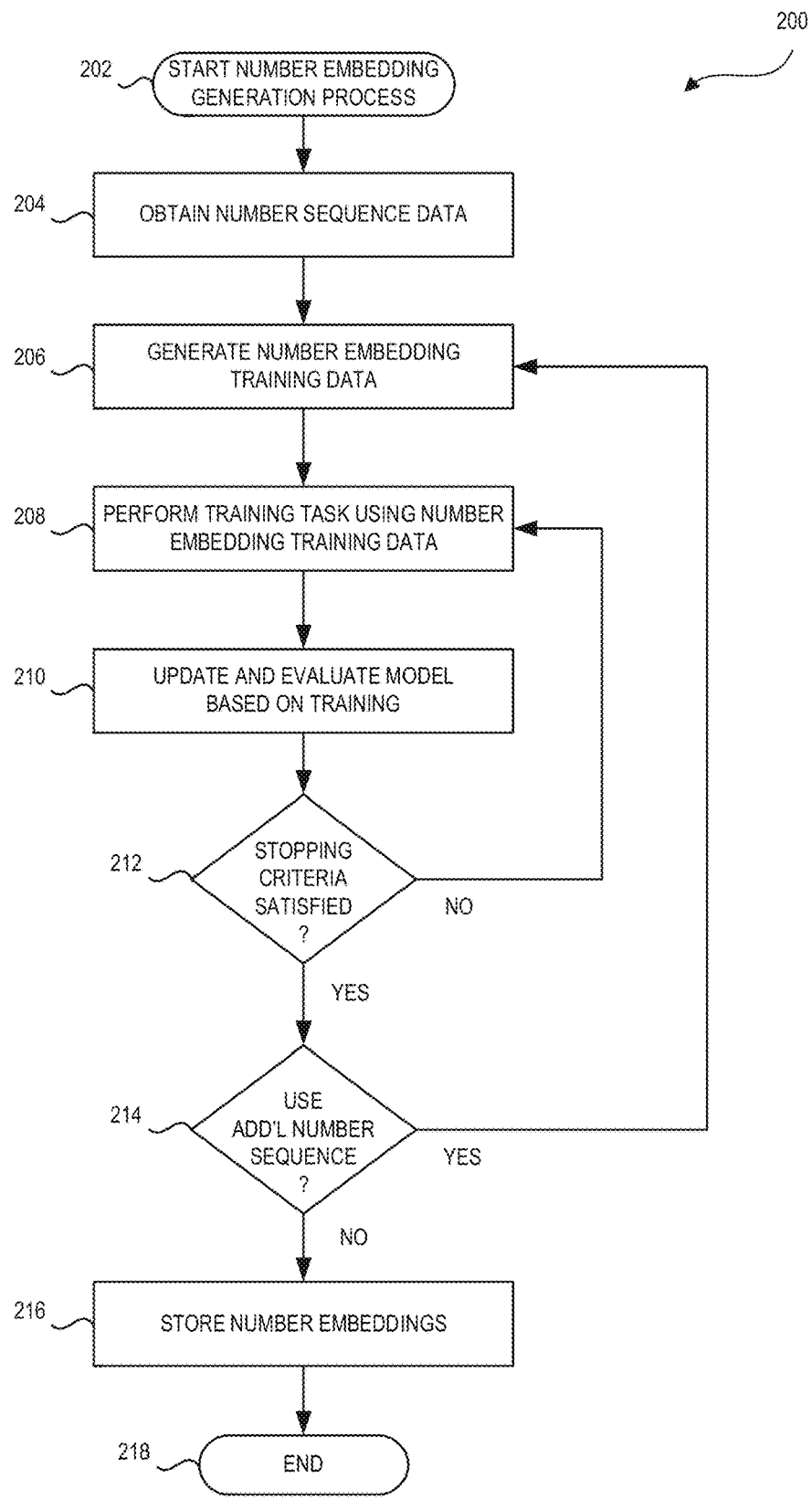
FIG. 2 illustrates a flow diagram of a routine for generating number embeddings, according to certain aspects of the present disclosure.

FIG. 2 illustrates a flow diagram of a routine 200 for generating number embeddings according to some embodiments. The routine 200 will be described with additional reference to FIG. 3, which is a block diagram showing data flows and interactions between components of an embedding generation system 110 during generation of number embeddings.

Advantageously, the routine 200 may include use of machine learning to analyze and model number sequence data. By using a machine learning algorithm to train a machine learning model using one or more number sequences, the resulting model represents—and is useful in making predictions regarding—sequences and other patterns of numbers. The model parameters will take on values that relate to the patterns of numbers in various ways, and the parameters (or information derived therefrom) may therefore be used as, or form the basis for, number embeddings.

To execute routine 200, a set of executable program instructions stored on one or more non-transitory computer-readable media (e.g., hard drive, flash memory, removable media, etc.) may be loaded into memory (e.g., random access memory or "RAM") of a computing device. For example, a computing device, such as the computing device 900 shown in FIG. 9, may execute the routine 200 or portions thereof. Embedding generation instructions 912 may be loaded into memory 908 and executed by one or more processors 902.

The routine 200 begins at block 202. For example, the routine 200 may begin in response to an event, such as a command to generate number embeddings.

At block 204, the embedding training data generator 114 may obtain number sequence data. Number sequence data may be obtained from the number sequence data store 112, or from an external number sequence data source. The number sequence data may represent a listing of numbers that follow a particular pattern.

Figure 3:
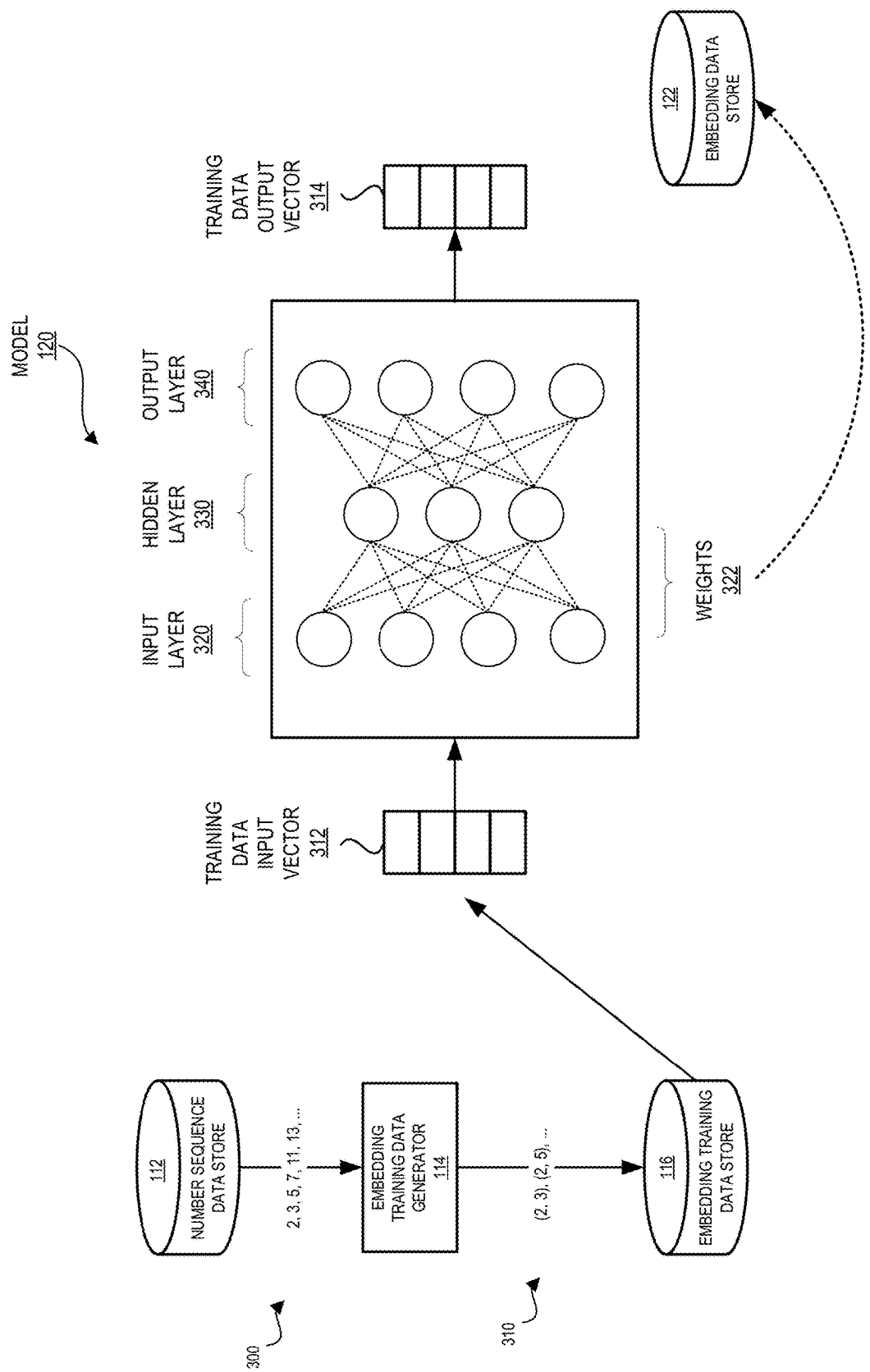
FIG. 3 illustrates a block diagram showing the training of a machine learning model and the generation of number embeddings, according to certain aspects of the present disclosure.

FIG. 3 shows an example embodiment in which the embedding training data generator 114 obtains number sequence data 300 from the number sequence data store 112. In some embodiments, as shown, the number sequence data 300 may represent a sequence of prime numbers. In some embodiments, the number sequence data 300 may represent additional and/or alternative sequences of numbers. For example, the number sequence data may represent: a sequence of counting numbers, a sequence of prime numbers, a Fibonacci sequence of numbers, a sequence of perfect square numbers, Recamán's number sequence, a Catalan number sequence, other number sequences, or some combination thereof. The sequence of numbers represented by the number sequence data may include a predetermined or dynamically determined quantity of numbers. In some embodiments, the sequence of numbers represented by the number sequence data may include a range from a predetermined or dynamically determined lower bound (e.g., 0 or 1) to a predetermined or dynamically determined upper bound (e.g., 1,000 or 1,000,000). In some embodiments, the embedding training data generator 114 may obtain sequence data representing multiple sequences from which to generate embedding training data.

At block 206, the embedding training data generator 114 may generate embedding training data from the number sequence data. In some embodiments, the embedding training data may be generated to train a machine learning model to predict a number in a sequence, given one or more other numbers of the sequence. For example, the embedding training data may be generated to train a machine learning model to predict a next number in a sequence, given one or more prior numbers of the sequence. Embedding training data generated for such a machine learning model training task may include a set of training input items that represent one or more prior numbers of the sequence. The embedding training data may also include a set of corresponding reference output items that represent the number to be predicted by the model. The embedding training data may be stored in the embedding training data store 116.

The example training tasks described herein are illustrative only, and are not intended to be limiting, required, or exhaustive of the training tasks that may be used to train a machine learning model. In some embodiments, additional or alternative training tasks may be used. For example, the embedding training data may be generated to train a machine learning model to predict a prior number in a sequence, given one or more subsequent numbers of the sequence. As another example, the embedding training data may be generated to train a machine learning model to predict a number at a particular location within a sequence, given numbers at one or more locations near the particular location (e.g., within a threshold number of locations before and/or after the particular location).

In the example illustrated in FIG. 3, the embedding training data 310 includes pairs of training input items and reference output items. In each pair, the first number is the training data input item, and the second number is the reference data output item. The embedding training data generator 114 may construct the pairs by proceeding through the number sequence data 300 and, at each location of the sequence, creating a training pair with the number at the current location as the reference data output item (e.g., the number that the model is to be trained to predict), and the number at the prior location as the training data input item (e.g., the number from which the model is to generate its prediction). The structure and example data shown in the embedding training data 310 is illustrative only, and is not intended to be required or limiting. In some embodiments, different structures may be used, number sequence data 300 may be grouped differently, etc. For example, a training data pair may include multiple training input items for a single reference output item. As another example, a training data pair may include training input items that occur after the reference output item within the number sequence data 300. As another example, a training pair may include one or more training input items that occur more than one location before and/or after the location of the reference output items, etc.

At block 208, the sequence modeler 118 may perform a portion of training of a model. The particular method of training may depend upon the type of machine learning model to be trained. The following example of training a machine learning model as part of a larger process of generating number embeddings will be described with respect to a machine learning model implemented as an artificial neural network ("NN"). However, other machine learning models may be used, including but not limited to: neural-network-based regression models, linear regression models, logistic regression models, decision trees, random forests, support vector machines ("SVMs"), Naïve or a non-Naïve Bayes network, k-nearest neighbors ("KNN") models, k-means models, clustering models, or any combination thereof. For brevity, aspects of model training may not be described with respect to each possible machine learning model that may be used. In practice, however, many or all of the aspects of the disclosure may apply to other machine learning models, including but not limited to those listed herein.

Generally described, NNs—including deep neural networks ("DNNs"), convolutional neural networks ("CNNs"), recurrent neural networks ("RNNs"), long short-term memory ("LSTM") NNs, other NNs, and combinations thereof—have multiple layers of nodes, also referred to as "neurons." Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of an input vector or a matrix of input vectors (e.g., a batch of training data input vectors), the NN may perform a "forward pass" to generate an output vector or a matrix of output vectors, respectively. The input vectors may each include n separate data elements or "dimensions," corresponding to the n nodes of the NN input layer (where n is some positive integer). Each data element may be a value, such as a floating-point number or integer. A forward pass typically includes multiplying the input vector (or matrix of input vectors) by a matrix representing the weights associated with connections between the nodes of the input layer and nodes of the next layer, and applying an activation function to the results. The process is then repeated for each subsequent NN layer. Some NNs have hundreds of thousands or millions of nodes, and millions of weights for connections between the nodes of all of the adjacent layers.

FIG. 3 illustrates an illustrative model 120 implemented as a NN that may be used in some embodiments. As shown, the example model 120 has an input layer 320 with a plurality of nodes, an internal layer 330 with a plurality of nodes, and an output layer 340 with a plurality of nodes. The number of nodes in each layer may be selected based on attributes of the number sequences on which the model 120 is to be trained, attributes of the number embeddings to be generated, and/or other factors. For example, as described below, the input layer 320 and output layer 340 may be sized according to the quantity of numbers for which number embeddings are to be generated (e.g., when generating number embeddings for 10,000 numbers, the input layer 320 and output layer 340 may each have 10,000 nodes). The internal layer 330 may be sized to correspond to the number of elements desired in each number embedding (e.g., to produce number embeddings with 200 elements, the internal layer 330 may have 200 nodes).

The specific number of layers shown in FIG. 3 is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, 50, or more internal layers. In some implementations, each layer may have the same number or different numbers of nodes. For example, the input layer 320 or the output layer 340 can each include more or less nodes than the internal layers 330. The input layer 320 and the output layer 340 can include the same number or different number of nodes as each other. The internal layers 330 can include the same number or different numbers of nodes as each other.

Input to a NN, such as the model 120 shown in FIG. 3, occurs at the input layer 320. A single input to the model 120 may take the form of an n-dimensional input vector with n data elements, where n is the number of nodes in the input layer 320. During training, the input vector may be a training data input vector 312. In some cases, multiple input vectors may be input into—and processed by—the model 120 at the same time. For example, when the model 120 is trained, a set of training data input vectors 312 (e.g., a "mini batch") may be arranged as an input matrix. In this example, each row of the input matrix may correspond to an individual training data input vector 312, and each column of the input matrix may correspond to an individual node of the input layer 320. The data element in any given training data input vector 312 for any given node of the input layer 320 may be located at the corresponding intersection location in the input matrix.

The number of elements in a training data input vector 312—and therefore the number of nodes in the input layer 320—may depend upon any of a variety of factors, such as the structure of the embedding training data 310, the quantity of number embeddings to be generated, the type of training being used, the structure of the model 120, etc. In some embodiments, the training data input vector 312 may be a 1-hot vector with a quantity of elements equal to the quantity of number embeddings to be generated. Each element of the training data input vector 312 may represent a corresponding number of a number embedding to be generated (e.g., a number of the sequence data 300). Each item of embedding training data 310 (e.g., each pair of training input item and corresponding reference output item) may be used to generate a training data input vector 312. The element of the training data input vector 312 that corresponds to the number represented by the training input item may be set to a first predetermined value (e.g., 1), and every other element of the training data input vector 312 may be set to a second predetermined value (e.g., 0). The same or a similar procedure may be used to generate a reference data output vector (not shown) that may be used to analyze output of the model and update the trainable parameters of the model, as described in greater detail below. For example, the element of the reference data output vector that corresponds to the number represented by the reference output item may be set to a first predetermined value (e.g., 1), and every other element of the training data input vector 312 may be set to a second predetermined value (e.g., 0).

The connections between individual nodes of adjacent layers are each associated with a trainable parameter, such as a weight and/or bias term, that is applied to the value passed from the prior layer node to the activation function of the subsequent layer node. For example, the weights associated with the connections from the input layer 320 to the internal layer 330 it is connected to may be arranged in a weight matrix 322 with a size m×n, where m denotes the number of nodes in the internal layer 330 and n denotes the dimensionality of the input layer 320. The individual rows in the weight matrix 322 may correspond to the individual nodes in the input layer 320, and the individual columns in the weight matrix 322 may correspond to the individual nodes in the internal layer 330. The weight w associated with a connection from any node in the input layer 320 to any node in the internal layer 330 may be located at the corresponding intersection location in the weight matrix 322.

Illustratively, the training data input vector 312 may be provided to a computer processor that stores or otherwise has access to the weight matrix 322. The processor then multiplies the training data input vector 312 by the weight matrix 322 to produce an intermediary vector. The processor may adjust individual values in the intermediary vector using an offset or bias that is associated with the internal layer 330 (e.g., by adding or subtracting a value separate from the weight that is applied). In addition, the processor may apply an activation function to the individual values in the intermediary vector (e.g., by using the individual values as input to a sigmoid function or a rectified linear unit ("ReLU") function).

In some embodiments, the model 120 may be an RNN, and the nodes of the internal layer 330 (or a subset thereof) may maintain their input, output, and/or data derived therefrom to a subsequent forward pass. In this way, the model 120 may learn to generate output (e.g., predictions of subsequent numbers of a number sequence) based on not only the current number that has been input, but also prior numbers of the number sequence. In some embodiments, the model 120 may use variations of recurrent nodes, such long short-term memory ("LSTM") nodes, gated recurrent unit ("GRU") nodes, or the like.

In some embodiments, there may be multiple internal layers, and each internal layer may or may not have the same number of nodes as each other internal layer. The weights associated with the connections from one internal layer (also referred to as the "preceding internal layer") to the next internal layer (also referred to as the "subsequent internal layer") may be arranged in a weight matrix similar to the weight matrix 322, with a number of rows equal to the number of nodes in the subsequent internal layer and a number of columns equal to the number of nodes in the preceding internal layer. The weight matrix may be used to produce another intermediary vector using the process described above with respect to the input layer 320 and first internal layer 330. The process of multiplying intermediary vectors by weight matrices and applying activation functions to the individual values in the resulting intermediary vectors may be performed for each internal layer subsequent to the initial internal layer 330.

The output layer 340 of the model makes output determinations from the internal layer(s) 330. Weights associated with the connections from the last internal layer to the output layer 340 may be arranged in a weight matrix similar to the weight matrix 322, with a number of rows equal to the number of nodes in the output layer 340 and a number of columns equal to the number of nodes in the last internal layer. The weight matrix may be used to produce an output vector 314 using the process described above with respect to the input layer 320 and first internal layer 330.

An output vector 314 may include data representing the prediction of the model 120 regarding the number sequence. In the present example, the model 120 is configured to predict the number at a particular location of a number sequence based on a training data input vector 312 that represents a number at another location of the number sequence (e.g., a number at a location that precedes or follows the particular location). The training data output vector 314 may have a quantity of elements that corresponds to the quantity of numbers in the number sequence, as with the training data input vector 312. In this example, the elements of the training data output vector 314 may have values for probabilities or other scores that represent the degree to which a number, corresponding to the element, is the number to be identified by the model 120. The model 120 may be used to generate a training data output vector 314 for each training data input vector 312, or for a subset thereof.

The sequence modeler 118 can in some embodiments determine whether the number embedding training data comprises or may be used to generate additional training data input vectors and corresponding reference data output vectors for the current iteration of training the machine learning model. If the additional training data input vectors and corresponding reference data output vectors are for the current iteration of training the machine learning model, the routine 200 may continue at block 208; otherwise, the routine 200 may proceed to block 210.

At block 210, the sequence modeler 118 may update parameters of the model 120 based on the training output generated above. Updating the parameters of the model 120 may be based on evaluation of an objective function, also referred to as a loss function. The objective function is used to analyze the difference between the output produced by the model 120 for a given training data input vector 312 (where the output of the model is the training data output vector 314) and the "correct" output that corresponds to the training data input vector 312. The output produced by the model 120 is the training data output vector 314, and the "correct" output is a reference data output vector.

As described above, the number embedding training data 310 from which the training data input vectors 312 are drawn may also be used to generate reference data output vectors or other reference data output items. Each reference data output vector may correspond to a training data input vector 312, and may include the "correct" or otherwise desired output that a model should produce for the corresponding training data input vector 312. For example, a reference data output vector may be a 1-hot vector with a quantity of elements equal to the quantity of numbers in the particular number sequence data 300 being used. Each element of the reference data output vector may represent a corresponding number of the number sequence data 300. Each item of embedding training data 310 (e.g., each pair of training input item and corresponding reference output item) may be used to generate a reference data output vector. The element of the reference data output vector that corresponds to the number represented by the reference output item may be set to a first predetermined value (e.g., 1), and every other element of the reference data output vector may be set to a second predetermined value (e.g., 0). The objective of the training task may be to minimize the difference between the training data output vectors 314 and corresponding reference data output vectors.

To evaluate the training data output vectors 314 and corresponding reference data output vectors, the sequence modeler 118 may compute an objective function, such as a cross-entropy loss function, a L2 Euclidean loss function, a logistic loss function, a hinge loss function, a square loss function, or a combination thereof.

The sequence modeler 118 can in some embodiments compute a gradient based on differences between the encoded training data output vectors and the encoded reference data output vectors. For example, a derivative, or "gradient," can be computed that corresponds to the direction in which each parameter of the machine learning model 120 is to be adjusted in order to improve the model output (e.g., to produce output that is closer to the correct or preferred output for a given input). In some embodiments, the sequence modeler 118 can compute the gradient for a subset of the training data, rather than the entire set of training data. Therefore, the gradient may be referred to as a "partial gradient" because it is not based on the entire corpus of training data. Instead, it is based on the differences between the training data output vectors and the reference data output vectors when processing only a particular subset of the training data.

The sequence modeler 118 can update a parameter of the machine learning model based on the gradient. For example, the sequence modeler 118 can update some or all parameters of the machine learning model 120 using a gradient descent method. In one embodiment, parameters of the machine learning model 120, including weights of the weight matrix 322, are updated using back propagation. In back propagation, a training error is determined using a loss function, and the training error may be used to update the individual parameters of the machine learning model 120 in order to reduce the training error. A gradient may then be computed for the loss function to determine how the weights in the weight matrices, such as weight matrix 322, are to be adjusted to reduce the error. The adjustments may be propagated back through the model 120 layer-by-layer.

At decision block 212, the sequence modeler 118 may determine whether one or more stopping criteria are satisfied. For example, the termination criteria can be based on the accuracy of the machine learning model 120 as determined using the loss function, the number of iterations of back propagation, a length of timing that training has been performed, other criteria, or some combination thereof. If the stopping criteria are satisfied, the routine 200 can proceed to decision block 214; otherwise, the routine 200 can return to block 208.

At decision block 214, the sequence modeler 118 may determine whether there is any additional number sequence to be used to train the model. For example, the sequence modeler 118 may train the model 120 using number sequence data 300 regarding a sequenced of prime numbers first, and then continue to train the model 120 with number sequence data 300 regarding one or more other number sequences. If there are additional number sequences to be used, the routine 200 may return to block 206; otherwise, the routine 200 may proceed to block 216.

At block 216, the sequence modeler 118 may store number embeddings generated as a result of training the model 120. By training a machine learning model 120 using number sequence data, as described in the examples above, the model parameters will take on values that relate to the sequences of numbers in various ways. The model parameters (or data derived therefrom) may be extracted from the model 120 as the number embeddings.

In one specific, non-limiting embodiment, the weights 322 that are applied to input in order to produce an encoded internal representation of the input represent at least a portion of what the model 120 has learned about the number sequences during training. The weights 322 (or data derived therefrom) may therefore be used as number embeddings. For example, if the input layer 320 is configured to receive a 1-hot vector, then for each number that is input to the model in the form of a 1-hot training data input vector, only weights corresponding to a single node of the input layer 320 (e.g., the node that receives a value of 1) are passed to the internal layer 330. Thus, those weights, of which there may be a same number as the number of nodes of the internal layer 330, may comprise the elements of the number embedding for the number that corresponds to the 1-hot training data input vector. In this example, if the internal layer has n nodes (e.g., 200 nodes), then the number embedding for any given number may be a 200-element number embedding.

In another specific, non-limiting embodiment, the number embeddings may be obtained from an internal representation of at least a portion of the model 120, such as the internal layer 330 (or one of the internal layers 330 if there are multiple). For example, an input vector that corresponds to a given number may be input into the model 120. Weights and biases may be applied, and activation functions may be calculated, gating functions may be evaluated (e.g., when the NN is an RNN or LSTM and prior numbers in a sequence have been input into the model 120 already), and various other operations may be performed to arrive at a set of numbers at a particular internal layer 330. Those numbers, of which there may be a same number as the number of nodes of the internal layer 330, may comprise the elements of the number embedding for the number that corresponds to the input vector.

The examples of obtaining number embeddings from a trained model 120 describe herein are illustrative only, and are not intended to be limiting, required, or exhaustive of methods by which number embeddings may be obtained from a trained model 120.

At block 218, the routine 200 may terminate.

Figure 4:
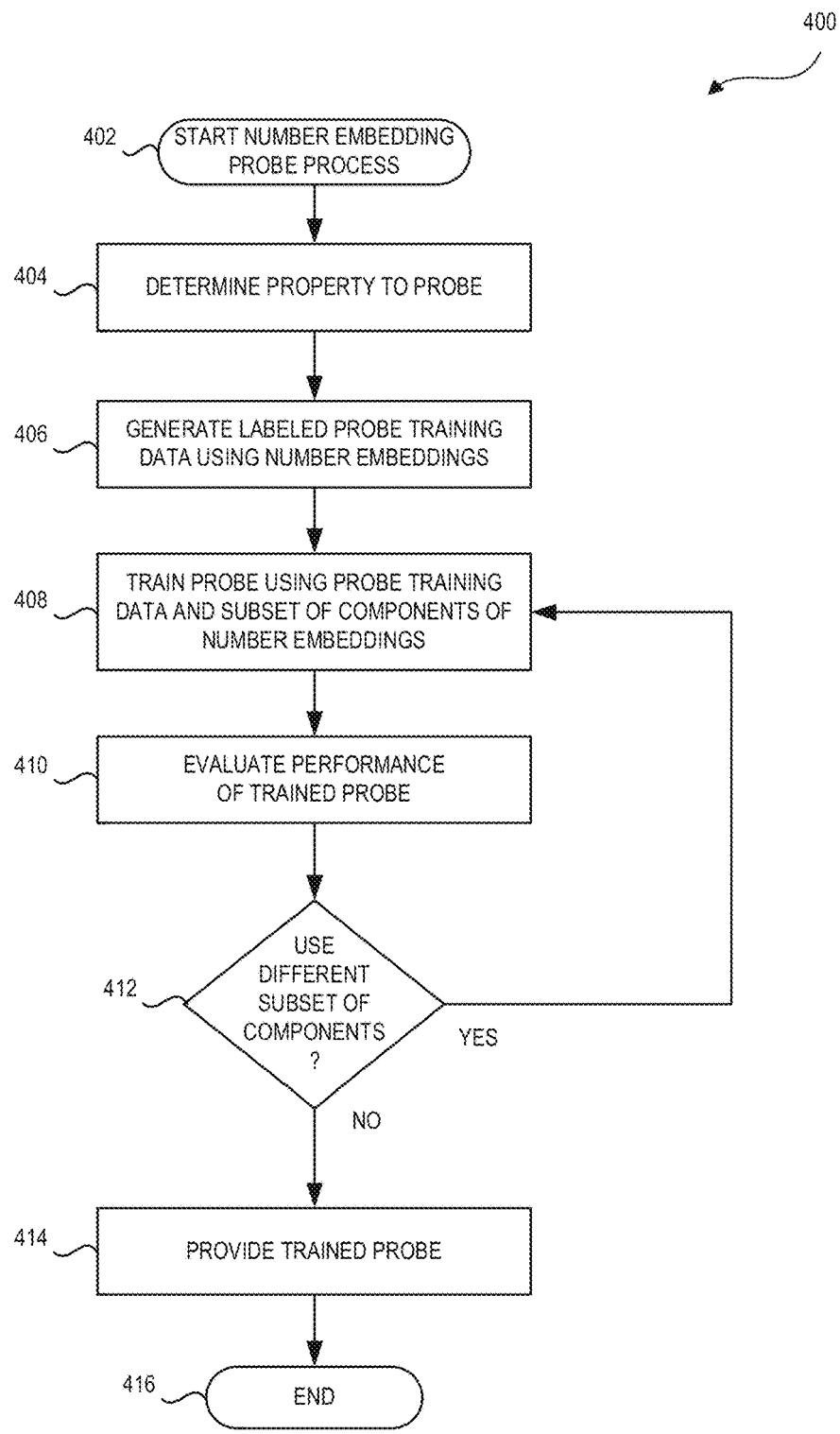
FIG. 4 illustrates a flow diagram of a routine for probing number embeddings, according to certain aspects of the present disclosure.

FIG. 4 illustrates a flow diagram of a routine 400 for probing number embeddings according to some embodiments. The routine 400 will be described with additional reference to FIG. 5, which is a block diagram showing data flows and interactions between components of an embedding probe system 130 during probing of number embeddings.

Advantageously, the routine 400 may include use of machine learning to probe number embeddings and determine features of numbers represented by the number embeddings. Probing the number embeddings may include analyzing subsets of elements of the number embeddings (e.g., one or more dimensions of the number embedding vectors) to determine whether the subsets are indicative of a characteristic of the numbers represented by the number embeddings. In some embodiments, transformations or other functions of the values of a subset of one or more elements may indicate a particular property of certain numbers (e.g., the output of a function of the values of elements i and j of a particular number embedding may indicate that the number represented by the number embedding is a prime number if the function output is within a certain range). The value of a different subset of one or more dimensions may indicate a different property of certain numbers (e.g., the output of a function of the value of element k may indicate that the number represented by the number embedding is odd if the output is negative). In some embodiments, a subset of elements may be used to identify more than one property (e.g., the output of a function of the value of element j from the example above, and a different element m, may indicate that the number represented by the number embedding is divisible by another number x if the output is greater than a threshold value).

A trained number embedding probe can be used to identify other numbers associated with a particular characteristic. The use of systematic probe training process like the routine 400 described herein, in which machine learning is used to probe the number embeddings, allows the embedding probe system 130 to generate a probe without knowing in advance which elements, subsets of elements, transformations to elements, and other element-based analysis of the number embeddings indicate characteristics of numbers represented by the number embeddings.

To execute routine 400, a set of executable program instructions stored on one or more non-transitory computer-readable media (e.g., hard drive, flash memory, removable media, etc.) may be loaded into memory (e.g., random access memory or "RAM") of a computing device. For example, a computing device, such as the computing device 900 shown in FIG. 9, may execute the routine 400 or portions thereof. Embedding probe instructions 914 may be loaded into memory 908 and executed by one or more processors 902.

The routine 400 begins at block 402. For example, the routine 400 may begin in response to an event, such as a command to generate a number embedding probe.

At block 404, the probe training data generator 132 can determine a numeric property (or properties) for which number embeddings are to be probed. The property for which the number embeddings are to be probed may be a property of the numbers represented by each of the number embeddings. In some embodiments, if the numbers represented by the number embeddings are integers, the property may be an integer-based property. For example, for a given number n, the property may be an order of magnitude of the integer, such as that represented by the function floor(log 10(n)). As another example, the property may be divisibility by some other integer x, as represented by the expression n mod x. As a further example, the property may be the primality of the number, as represented by the function is_prime(n). A yet another example, the property may the number itself: whether n can be derived by probing the number embedding for n without prior knowledge of the value of n. The example properties described herein are illustrative only, and are not intended to be limiting, required, or exhaustive of the properties for which a probe may be generated.

In some embodiments, the property for which a probe is to be generated may be specified by a user. For example, a user may access a graphical user interface and request generation of a probe for a particular property. The user may also provide or indicate the number embeddings on which the probe is to be trained.

At block 406, the probe training data generator 132 can generate probe training data using the number embeddings. In some embodiments, the probe training data may be generated to train a machine learning model to perform a binary classification of a number embedding as representing a number having or not having the property (or properties) for which the probe is being generated. For example, if the property for which the probe is being generated is primality of numbers, the probe training data may be generated to train a machine learning model to classify a number embedding as representing a number that either is or is not a prime number. In this example, the machine learning model may be a logistic regression model.

The example training tasks described herein are illustrative only, and are not intended to be limiting, required, or exhaustive of the training tasks that may be used to train a machine learning model. In some embodiments, additional or alternative training tasks may be used. For example, the probe training data may be generated to train a machine learning model to make a classification decision from among a non-binary but still finite set of classes (e.g., 3 or more possible classes). In this example, the machine learning model may be a multiclass support vector classification ("SVC") model. As another example, the probe training data may be generated to train a machine learning model to make a classification decision from among a potentially infinite number of classes (e.g., using a continuous and substantially unbounded output). In this example, the machine learning model may be a regression model.

To generate the probe training data, the probe training data generator 132 may apply labels to at least a subset of the number embeddings, indicating the property for which the probe is to be generated. An individual item of training data may include a number embedding or a portion thereof, such as a subset of elements of the number embedding. The training data item may also include label data indicating the property that applies to the number embedding. Multiple such training data items may be generated depending upon one or more criteria, such as the desired size of the training data set, the number of number embeddings available, etc. The probe training data may be stored in the probe training data store 134.

Figure 5:
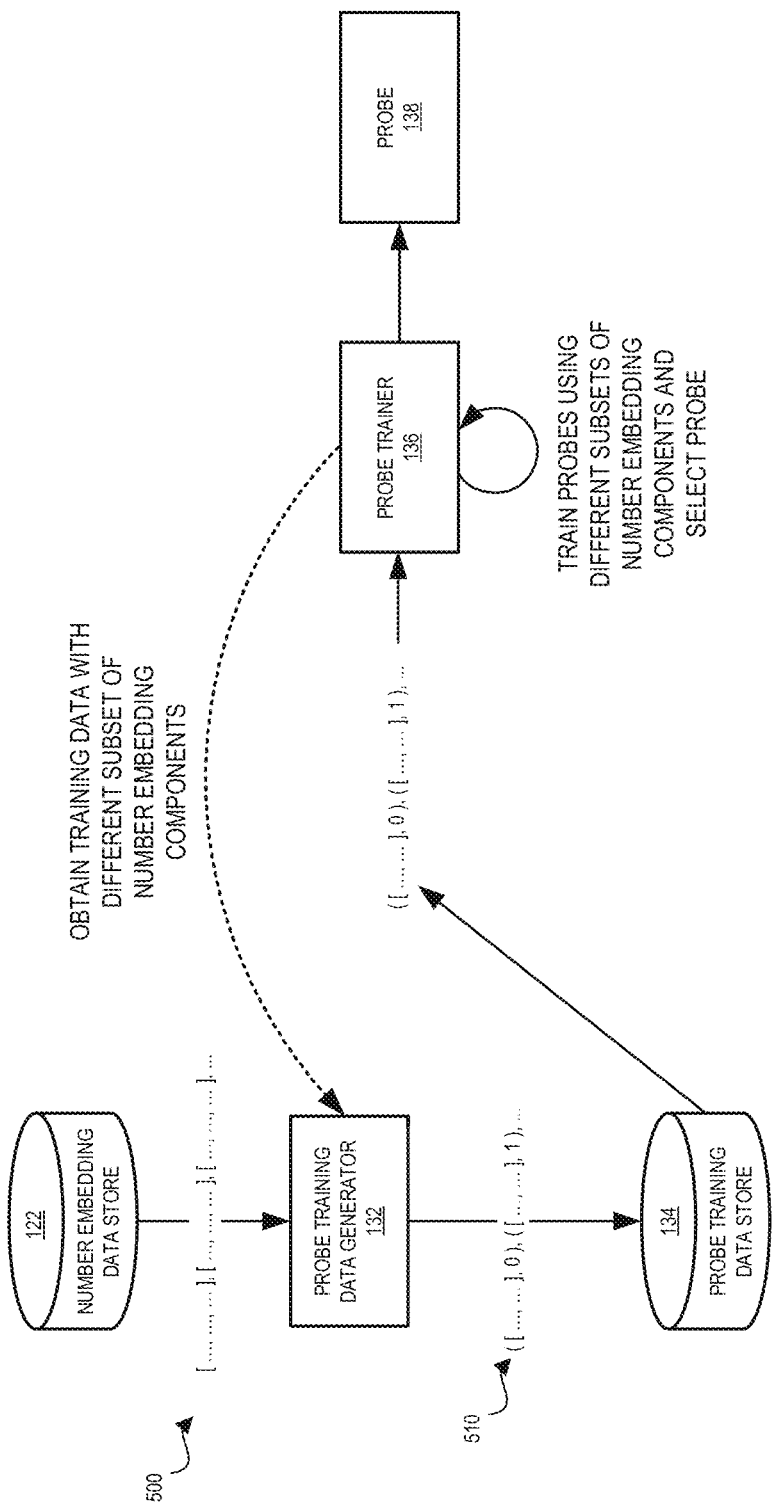
FIG. 5 illustrates a block diagram showing the probing of number embeddings, according to certain aspects of the present disclosure.

FIG. 5 shows an example embodiment in which the probe training data generator 132 obtains number embeddings 500 from the number embedding data store 122. In the illustrated example, the number embeddings 500 are multi-element representations such as multi-dimensional vectors (e.g., 200-element vectors generated using the routine 200 described above). Each number embedding may represent a different number. The probe training data generator 132 may apply labels to the number embeddings, or to a subset thereof. For example, the probe training data generator 132 may randomly select a first subset of number embeddings for training, and reserve a second subset of number embeddings to test the trained probe. The label data to be associated with each number embedding may be obtained from a user. For example, the label data may be specified in mapping of numbers, represented by the number embeddings, to proper classifications of the numbers based on the properties for which the probe is to be generated. In some embodiments, the probe training data generator 132 may automatically determine the label data based on known, calculated, or otherwise determined properties of the numbers represented by the number embeddings. For example, if the probe is to be trained to determine the order of magnitude of the number represented by a number embedding, then the probe training data generator 132 may compute the order of magnitude of each number, and generate label data representing the correct order of magnitude classification for each corresponding number embedding.

In the example illustrated in FIG. 5, the probe training data generator 132 generates probe training data 510 including pairs of training input items and label data. In each pair, the training data input item is a number embedding or a portion thereof, such as subset of individual elements of a number embedding. For example, if each number embedding has 200 elements, a subset of the 200 elements such as 1, 2, 5, or 10 elements may be extracted and included in a particular training data input item. Selection of specific elements of number embeddings to be include in the training data input item may be based on a predetermined setting (e.g., provided by a user), or may be dynamically determined. For example, portions of the routine 400 may be performed iteratively to train probes using different subsets of number embedding elements. Each of the trained probes may analyzed to determine the probe that performs best on the trained task. In this way, the embedding probe system 130 can automatically explore different combinations of elements of number embeddings and discover the combination that provides the best results for a given probe task. In some embodiments, the entire number embedding (e.g., all elements of the number embedding) may be included in the initially-created pairs of probe training data 510. In this case, the individual elements to be used by the machine learning model may be selected before or during the process of training the model.

The label data included in each training data pair may represent the appropriate class of the number embedding from which the training data input item is derived. For example, if the probe to be trained is a binary classification probe (e.g., prime/not prime), then each item of label data may take either a first value indicating a first classification (e.g., 1=prime) or a second value indicating a second classification (e.g., 0=not prime). The probe training data generator 132 may construct the pairs by proceeding through the first subset of number embeddings 500 and creating a training pair for each number embedding.

The structure and example data shown in the probe training data 510 is illustrative only, and is not intended to be required or limiting. In some embodiments, different structures may be used, training data items may include different quantities or structures of number embedding elements, label data may take different values or be structured differently, etc. For example, a training data pair may include label data with multiple values if the probe is to be used to determine multiple properties of number embeddings, if there are more than two possible classes for a particular property, etc.

At block 408, the probe trainer 136 can train a probe 138 using the probe training data 510. The probe 138 may be trained to analyze a subset of elements of the number embeddings. In some embodiments, the training data 510 may have been generated such that the training data input item in each training data pair includes only the subset of number embedding elements to be used. In some embodiments, the training data 510 may include the entire number embedding, and the probe trainer 136 selects the subset of elements to be used. For example, the probe trainer 136 may select i elements from each number embedding, where i>0 and where i<total number of elements in each number embedding. The elements selected from each number embedding may be at the same position, offset, or other index of the number embedding. For example, if the elements at indices 23 and 57 are to be used as input to the machine learning model, then the elements at indices 23 and 57 for each of the number embeddings in the set of training data are used.

In some embodiments, the subset of number embedding elements to be used may be determined based on an iterative process of training probes using different subsets of number embedding elements and selecting the best performing probe (s). One iteration of the process (e.g., including blocks 408 and 410) may be performed using a first subset of number embedding elements, another iteration of the process may be performed using a second subset of number embedding elements, and so on. For example, the first subset of elements may include the first j elements of the number embeddings, such as elements with indices 0 to j−1. The second subset of elements may comprise one or more elements from the first subset and one or more other elements, such as elements with indices 0 to j−2 and j. Additional subsets may be determined for additional iterations such that each possible set of j elements is used. In some embodiments, additional iterations may be performed using subsets of k elements, where k< >j.

Training the probe 138 may involve training a machine learning model to classify training data input items in one or more classes indicated by label data. Illustratively, if the probe 138 is to be a binary classifier, then the machine learning model may be a binary classification model, such as a logistic regression model. If the probe 138 is to be a non-binary classifier that still uses a finite set of classes (e.g., 3 or more possible classes), the machine learning model may be a multiclass SVC model. If the probe 138 is to make a classification decision from among a potentially infinite number of classes (e.g., using a continuous and substantially unbounded output), the machine learning model may be a regression model.

In some embodiments, during training, the probe trainer 136 may use a training algorithm to iteratively process the training data input items and update parameters of the machine learning model of the probe 138, with the goal of improving the model's ability to output data similar to, or that otherwise corresponds to, the label data associated with the training data input items. The iterative training process may continue until a convergence or loss function condition is met (e.g., until the difference between a generated output and the label data is sufficiently small). The particular loss function may be any suitable loss function for the particular type of model and training task being performed. Examples of loss functions include cross-entropy loss, hinge loss, softmax loss, and multiclass support vector machine ("SVM") loss. Any suitable training algorithm be used for the particular type of model and training task being performed. Examples of training algorithms for neural network-based models include algorithms based on backward or forward propagation.

At block 410, the probe trainer 136 can evaluate the performance of the trained probe 138. Evaluating performance of the probe 138 may include using input data items that are similar to the training data input items. For example, a second subset of number embeddings may be used to generate a second subset of input data items and corresponding label data. The particular number embedding elements (e.g., the subset of elements, as represented by indices) to be input into the probe 138 may be the same as those used during training. The output of the probe (e.g., the classification determinations) may be analyzed with respect to the label data that corresponds to teach input. Based on this analysis, an accuracy determination may be made for each of the input items. The accuracy determinations for the entire set of input items used in the evaluation may be analyzed to determination an overall evaluation score, such as an overall accuracy score for the probe 138. In some embodiments, other methods may be used to evaluate the probe 138. For example, if the probe 138 is implemented using a linear regression model, then the evaluation may be based on a statistic that measures linear correlation between two variables, such as the Pearson correlation coefficient.

At decision block 412, the probe trainer can determine whether to use a different subset of number embedding elements to train the probe 138, or to train a different probe 138. If so, the routine 400 can return to block 408. Otherwise, if no additional subset of number embedding elements is to be used in training, the routine 400 can process to block 414.

At block 414, the probe trainer 136 can identify the probe 138 that provides the highest degree of performance (if multiple probes 138 were trained). The identified probe 138 may then be provided for use in analyzing number embeddings. An example process for analyzing number embeddings is described in greater detail below.

At block 416, the routine 400 may terminate.

Figure 6:
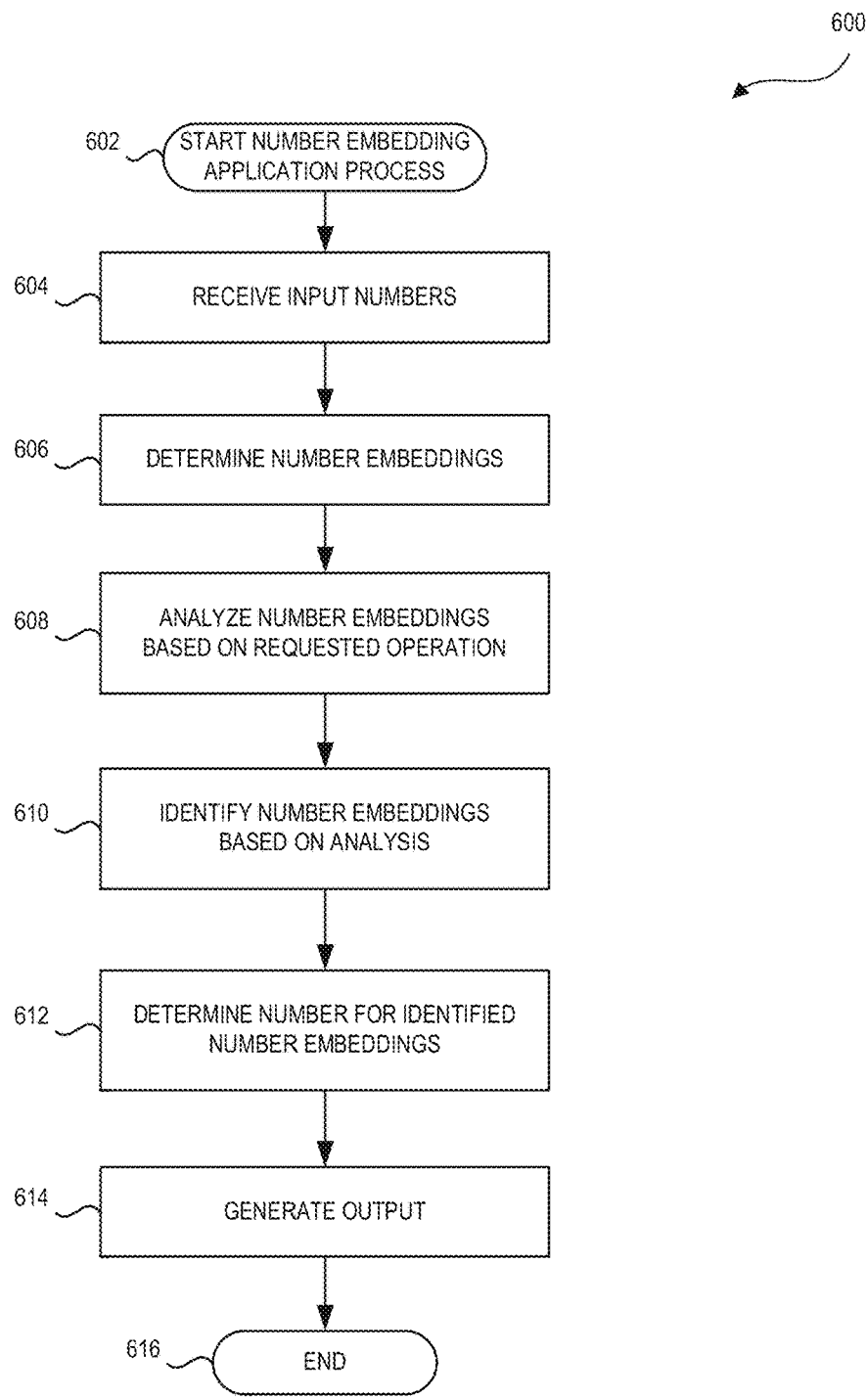
FIG. 6 illustrates a flow diagram of a routine for analyzing numerical data using number embeddings, according to certain aspects of the present disclosure.

FIG. 6 illustrates a flow diagram of a routine 600 for analyzing number embeddings and otherwise using number embeddings to perform various operations according to some embodiments. The routine 600 will be described with additional reference to FIG. 7, which is a block diagram showing data flows and interactions between various computing systems and components of an embedding application system 150 via an interactive user interface, and FIG. 8, which is a block diagram showing data flows and interactions between various computing systems and components of the embedding application system 150 via an application programming interface ("API").

Advantageously, the routine 600 may include use of various analysis and comparison methods to analyze aspects of number embeddings, select numbers represented by the number embeddings that satisfy certain constraints, and otherwise produce results informed by the number embeddings. The use of number embeddings as described in the example routine 600 allows the embedding application system 150 to produce results based on the numeric insights encoded within the number embeddings that may not be known, or that may not be implemented in computation rules and executable code. Although the routine 600 will be described with respect to certain example applications and uses of number embeddings, the examples are illustrative only and are not intended to be limiting. In some embodiments, the embedding application system 150 may use number embeddings in additional and/or alternative applications.

To execute routine 600, a set of executable program instructions stored on one or more non-transitory computer-readable media (e.g., hard drive, flash memory, removable media, etc.) may be loaded into memory (e.g., random access memory or "RAM") of a computing device. For example, a computing device, such as the computing device 900 shown in FIG. 9, may execute the routine 600 or portions thereof. Embedding application instructions 916 may be loaded into memory 908 and executed by one or more processors 902.

The routine 600 begins at block 602. For example, the routine 600 may begin in response to an event, such as receiving a request or command to analyze one or more numbers or generate some other output using number embeddings.

Figure 7:
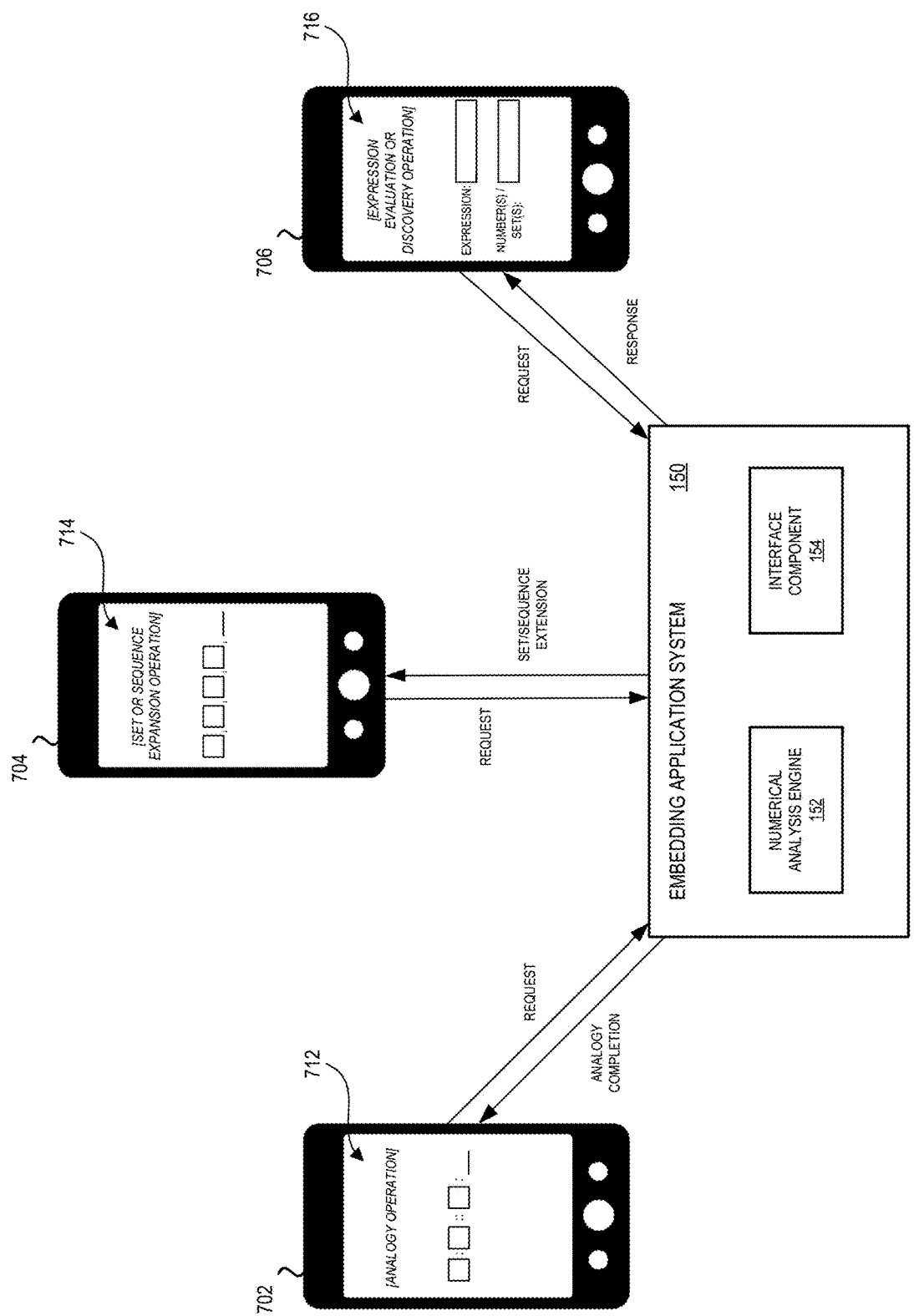
FIG. 7 illustrates a block diagram showing various computing systems that request number embedding-based functionality provided by an embedding application system.

In some embodiments, as shown in FIG. 7, such a request or command may be received via a user interface provided by or otherwise associated with the embedding application system 150. Illustratively, the interface component 154 may generate display instructions (e.g., Hypertext Markup Language or "HTML" instructions for a web page) that cause presentation of a user interface by a user computing device, or a user computing device may have application software (e.g., an "app") that causes presentation of an interface and communicates with the embedding application system 150. The user interface may allow a user to submit a request or command for analysis or other output. For example, a user of user computing device 702 may use interface 712 to request completion of a numeric analogy, such as: a given number $x_1$ is to a second given number $x_2$ as a third given number $x_3$ is to a fourth number (e.g., 172: 176:: 672: ?). As another example, a user of computing device 704 may use interface 714 to request completion or continuation of a sequence, or some other expansion of a given set (e.g., given a set of numbers associated with a particular property or combination of properties, provide an additional number or subset of numbers also associated with the property; given a sequence of numbers, provide the next number or subsequence of numbers; etc.). As a further example, a user of user computing device 706 may use interface 716 to submit an expression for evaluation. The expression may be compound or otherwise more complex than the analogies and expansions in the other two interfaces. In some cases, the expression may be an algebraic or calculus expression to be evaluated or equation to be solved. In some cases, the expression may be in the form of a template in which individual operations may be specified in various combinations and with respect to various numbers or sets of numbers. In some cases, the expression may be in the form of an assertion to be analyzed with respect to various numbers or sets of numbers.

Figure 8:
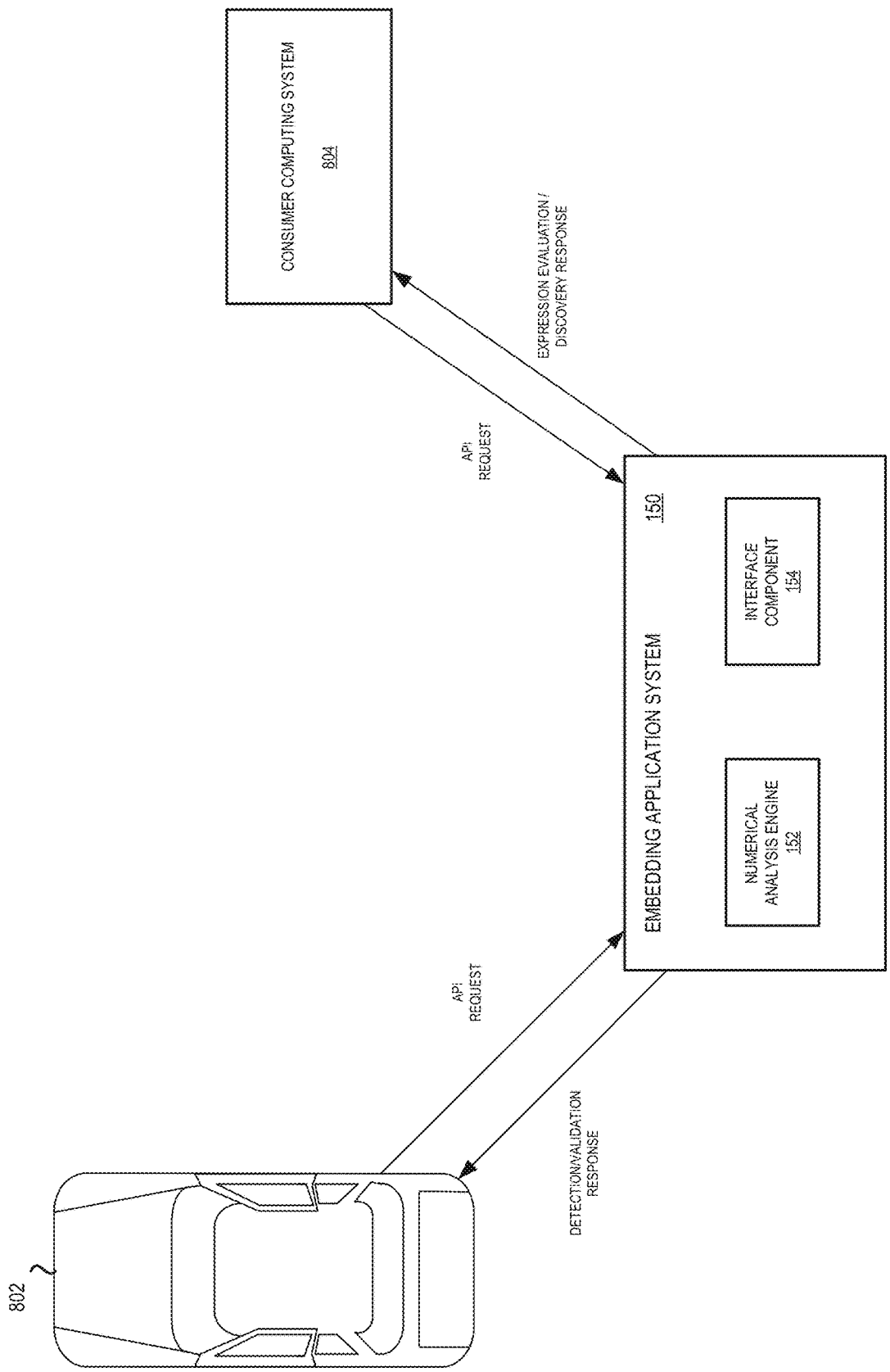
FIG. 8 illustrates a block diagram showing various computing systems that request number embedding-based functionality provided by an embedding application system.

In some embodiments, as shown in FIG. 8, a request or command may be received via a programmatic call, such as a call to an API that is exposed via the interface component 154. In these embodiments, computing systems may interact with the embedding application system 150 via the API to utilize the number embedding-based analysis tools and features provided by the embedding application system 150. The computing systems may do so in order to further their own operations. For example, a vehicle 802 (e.g., a vehicle used for ride-sharing purposes, a vehicle that provides driver-assist functionality, and/or an automated or autonomous vehicle (AV)) may provide numeric input (e.g., address information, contact information, etc.) to the embedding application system 150 for analysis regarding whether the numeric input is expected, or is fraudulent or otherwise irregular. As another example, the embedding application system 150 may provide backend embedding-based analysis functionality to a consumer system 804, such as a data processing system, a numeric analysis system, a fraud detection system, or the other system that consumes results of number embedding-based analysis performed by the embedding application system 150.

In some embodiments, the embedding application system 150 may be part of the computing system that is requesting number embedding-based functionality. For example, the embedding application system 150 (or individual components thereof) may execute on one of the user computing devices 702, 704, 706 shown in FIG. 7, or the vehicle 802 shown in FIG. 8.

The request received by the embedding application system 150 may include operation data specifying the operation(s) to be performed by the embedding application system 150. The operation data may be entered into, or derived from data entered into, one or more operation entry fields displayed via a user interface. In implementations using an API instead of (or in addition to) a user interface, the operation data may be embedded in a function call, provided as a parameter, derived from parameter data, or the like. In some embodiments, the operation(s) may be or include: evaluating an expression, solving an equation, a numeric analogy operation, a sequence completion task, a set expansion task, a fraud or other irregularity detection task, or some other task in which the benefits of number embeddings may be leveraged. In some embodiments, the operation data that specifies a given operation may include an alphanumeric or other symbolic representation of the operation (e.g., $x_1$: $x_2$:: $x_3$: ?, y=mx+b, etc.), or an identifier of a predetermined template or expression.

At block 604, interface component 154 can receive one or more input numbers for analysis. The request received by the embedding application system 150 may include number data specifying the number(s) and/or number group(s) to be used by the embedding application system 150 in processing the request. The number data may be entered into, or derived from data entered into, one or more numeric entry fields displayed via a user interface. In implementations using an API instead of (or in addition to) a user interface, the number data may be embedded in a function call, provided as a parameter, derived from parameter data, or the like. In some embodiments, the numbers may be or include: constants or variables for an expression or equation; arguments for an analogy; sets or sequences for an expansion or completion task; received or measured data for fraud or irregularity detection, or some other numeric input.

At block 606, the numerical analysis engine 152 can obtain or otherwise determine number embeddings for the input numbers received for analysis. The numerical analysis engine 152 may include or be in contact with computer-readable storage, such as an embedding data store in which number embeddings are stored. The number embeddings may be pre-trained number embeddings, such as number embeddings generated using the process described in greater detail above. Each number embedding may be tagged or otherwise associated with a corresponding number represented by the number embedding. The numerical analysis engine 152 may obtain number embeddings based on the number data received in a given request.

At block 608, the numerical analysis engine 152 can analyze the number embeddings. The analysis may include generating data representing a shared property or other similarity among number embeddings, such as a similarity metric. For example, the analysis of the embeddings may include determination of a cosine distance or Euclidian distance in which the number embeddings are multi-dimensional vectors, and the distance between different number embeddings represents a degree of similarity. As another example, one or more classifiers such as those generated in a probing process like that described above may be used to analyze number embeddings and generate classifications representing various properties. Such classifications for different number embeddings can be compared to determine similarities, differences, etc. As a further example, rule-based analysis regarding evaluation of subsets of components of the multi-component number embeddings may be used. The particular analysis that is to be performed may be determined based on the operation requested.

In some embodiments, the requested operation is a set expansion and the number embeddings for the given set to be expanded (e.g., number embeddings for numbers provided with the request as number data or otherwise referenced by the request) may be analyzed to determine similarities and/or other relationships among the numbers in the given set to be expanded. The similarities and/or other relationships may be used later in the routine 600 to identify number embeddings that are similar in the same ways and/or which satisfy the same relationships, and are therefore candidates to be included in the set.

In some embodiments, the requested operation is a sequence extension or completion, and the number embeddings for the given sequence to be extended (e.g., number embeddings for numbers provided with the request as number data or otherwise referenced by the request) may be analyzed to determine similarities and/or other relationships among the numbers in the given sequence to be extended. The similarities and/or other relationships may be used later in the routine 600 to identity number embeddings that are similar in the same ways and/or which satisfy the same relationships, and are therefore candidates to be included in the sequence.

In some embodiments, the operation is an analogy and the number embeddings for the first portion of the analogy (e.g., $x_1$ and $x_2$ in the analogy $x_1: x_2 :: x_3: ?$) may be analyzed to determine similarities or other relationships. The similarities and/or other relationships may be used later in the routine 600 to identity number embeddings that are similar to the number embedding in the second portion of the analogy (e.g., $x_3$) in the same ways and/or which satisfy the same relationships.

In some embodiments, the operation may be a discovery operation in which a particular expression or logical statement is evaluated either alone, or as part of a command or hypothesis. For example, a command may be to perform a particular calculation using a subset of components of the multi-component number embeddings, such as subtracting the value of a 42nd component from a value of a 71st component. Based on the results, the numerical analysis engine 152 is to detect a pattern. For example, when the result is a negative number, the associated number embeddings tend to be representations of numbers that satisfy certain conditions, such as: the numbers tend to be prime more often than expected in a random sample of numbers, the numbers tend to be the result of a calculation with certain constraints (e.g., the resulting difference of a power of 3 being subtracted from a power of 2), etc.

In some embodiments, the operation may be a set membership query or numeric property query associated with a particular number. Illustratively, a vehicle 802 or consumer system 804 may provide one or more numbers in number data with a request to perform a validation or detection operation. Examples of such validation or detection operations may be fraud detection, numeric irregularity detection, input validation, or the like. The numerical analysis engine 152 may analyze the number embedding(s) for the input number(s) to detect particular properties of the numbers or similarities to numbers in defined sets. For example, the numerical analysis engine 152 may analyze a number embedding for an input number using a classifier (e.g., a classifier that classifies number embeddings as being associate with fraud or other irregularities, valid or invalid input for location or contact information, etc.). As another example, the numerical analysis engine 152 may analyze a number embedding in comparison with one or more predetermined number embeddings (e.g., those associated with fraud or other irregularities, those associated with valid or invalid input for location or contact information, etc.) to determine a similarity metric, such as a cosine distance. Depending upon the results of the analysis, the numerical analysis engine 152 may determine the output to be generated, such as output indicating set membership or numeric property association.

At block 610, the numerical analysis engine 152 can identify number embeddings based at least partly on the analysis of number data and operation data. In some embodiments, the numerical analysis engine 152 may identify one or more number embeddings that share the same properties or other similarities as determined in the analysis of number data.

In some embodiments, the operation may be a set expansion (e.g., given a set of numbers 5, 31, and 157, get additional numbers that share a property of the set, such as all numbers being prime). Additional number embeddings to which the numerical analysis engine 152 has access may be analyzed with respect to number embeddings for number data provided in the request (e.g., using cosine distance, classifiers, etc. to determine one or more similarity metrics), and the number embeddings associated with the properties or similarities may be identified to be included in the set. The numerical analysis engine 152 may not have been informed to look for prime numbers, but may have determined that the given set of numbers are all prime based on the analysis described above.

In some embodiments, the operation may be a sequence completion or extension (e.g., given a sequence of numbers 2, 3, 5, 7, 11, and 13, get one or more subsequent numbers of the sequence, which in this case is a sequence of prime numbers). Additional number embeddings to which the numerical analysis engine 152 has access may be analyzed with respect to number embeddings for number data provided in the request (e.g., using cosine distance, classifiers, etc. to determine one or more similarity metrics), and the number embeddings associated with the properties or similarities may be identified.

In some embodiments, the operation may be an analogy (e.g., $x_1: x_2 :: x_3: ?$). Additional number embeddings may be analyzed with respect to a number embedding for a number in the second portion of the analogy (e.g., $x_3$), and the number embeddings associated with the properties or similarities may be identified to complete the analogy.

In some embodiments, the operation may be a discovery operation, set membership query, or numeric property query. Number embeddings for any results may not necessarily be identified, as the results may instead be identification of a sequence or property, a response to an assertion, etc. Thus, block 610 and subsequent block 612 may not necessarily be performed.

At block 612, the numerical analysis engine 152 can determine the numbers associated with the number embeddings identified above at block 610. As described above, the numerical analysis engine 152 may include or be in contact with computer-readable storage, such as an embedding data store in which number embeddings are stored. The number embeddings may be pre-trained number embeddings, such as number embeddings generated using the process described in greater detail above. Each number embedding may be tagged or otherwise associated with a corresponding number represented by the number embedding. The numerical analysis engine 152 may obtain or otherwise determine the numbers associated with the number embeddings (if any) identified above.

At block 614, the interface component 154 can provide a response to the request. The result may indicate the numbers identified from the analysis, the confirmation or rejection of an assertion, or the like.

At block 616 the routine 600 may terminate.

Figure 9:
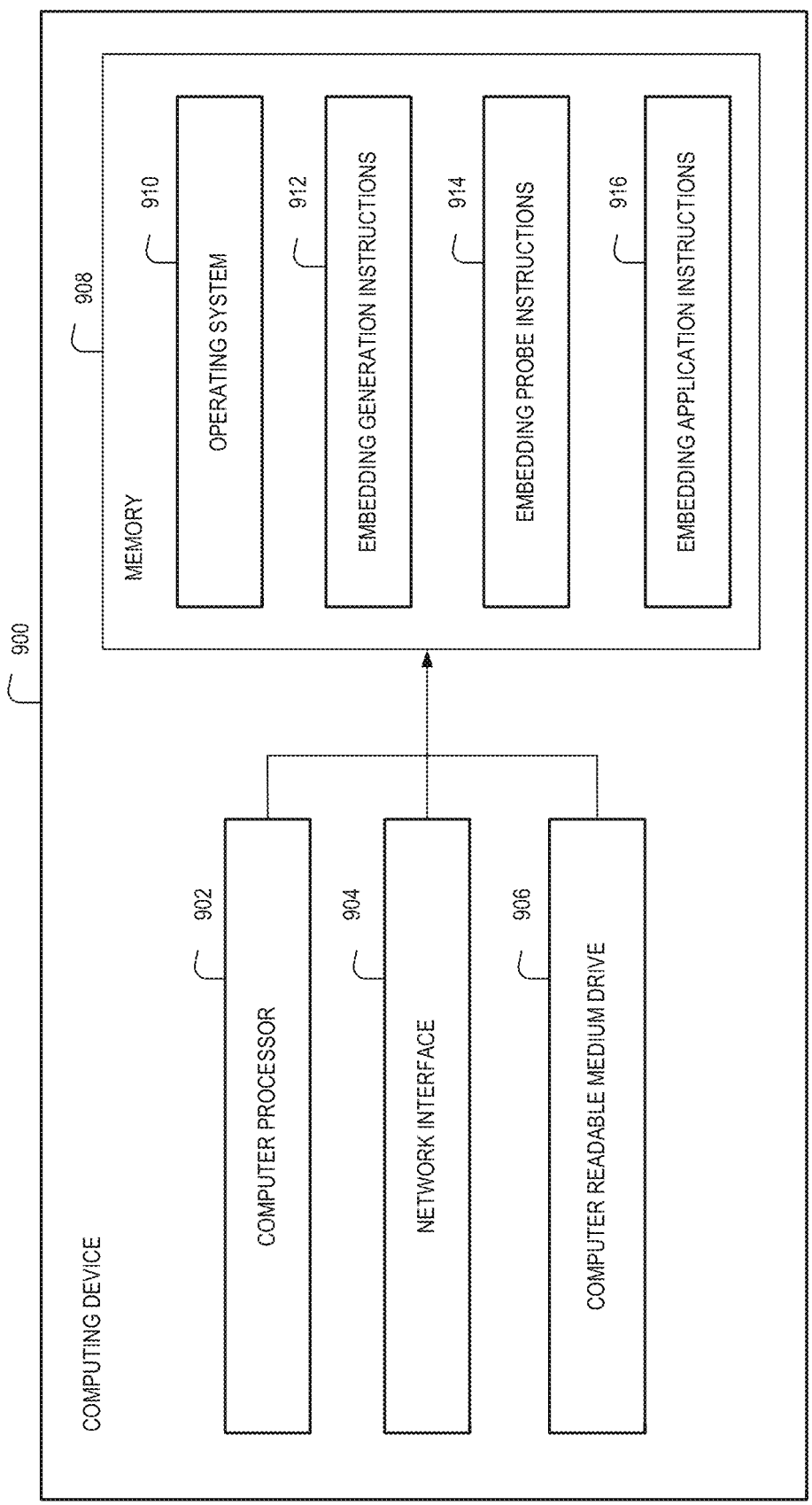
FIG. 9 illustrates a block diagram of a computing system configured to implement aspects of the present disclosure.

FIG. 9 shows components of an illustrative computing device 900 configured to implement aspects of the present disclosure. In some embodiments, as shown, the computing device 900 may include: one or more computer processors 902, such as physical central processing units ("CPUs"); one or more network interfaces 904, such as a network interface cards ("NICs"); one or more computer readable medium drives 906, such as a high density disk ("HDDs"), solid state drives ("SDDs"), flash drives, and/or other persistent non-transitory computer-readable media; and one or more computer readable memories 908, such as random access memory ("RAM") and/or other volatile non-transitory computer-readable media. The computer readable memory 908 may include computer program instructions that the computer processor 902 executes in order to implement one or more embodiments. For example, the computer readable memory 908 can an operating system 910 for general administration of the computing device 900. The computer readable memory 908 may also store embedding generation instructions 912 for managing the generation of number embeddings (e.g., as shown and described with respect to routine 200). The computer readable memory 908 may also include embedding probe instructions 914 for managing the probing of number embeddings (e.g., as shown and described with respect to routine 400). The computer readable memory 908 may also include embedding application instructions 916 for managing the use of number embeddings in analysis and other applications (e.g., as shown and described with respect to routine 600). In some embodiments, the computing device 900 may also include or be in communication with various other computing devices, data stores, and the like.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

Some example enumerated embodiments are recited in this section in the form of methods, systems, and non-transitory computer-readable media, without limitation.

One aspect of the disclosure provides a system comprising computer-readable memory storing executable instructions, and one or more processors. The one or more processors are programmed by the executable instructions to at least: obtain number sequence data representing a sequence of numbers, wherein individual numbers of the sequence of numbers are associated with a mathematical relationship with respect to one or more other numbers of the sequence of numbers; generate training data for an artificial neural network using the number sequence data, wherein the training data comprises a plurality of training data input items and a plurality of reference data output items, wherein a reference data output item represents a next number of the sequence of numbers to be generated from a corresponding training data input vector representing a prior number of the sequence of numbers; train the artificial neural network using the training data to generate number sequence predictions; obtain, from the artificial neural network, internal representation data associated with at least a subset of the sequence of numbers, wherein a first portion of the internal representation data comprises an internal representation of at least a portion of the artificial neural network generated based at least partly on a first number of the sequence of numbers; and generate a plurality of number embeddings from the internal representation data, wherein a first number embedding of the plurality of number embeddings comprises a multi-element representation of the first number, wherein a first subset of the multi-element representation is associated with a first property of the first number, and wherein a second subset of the multi-element representation is associated with a second property of the first number.

The system of the preceding paragraph can include any sub-combination of the following features: wherein the first number embedding comprises a vector of real numbers, and wherein the first subset of elements of the first number embedding comprises a subset of the real numbers; wherein the number sequence comprises one of: a sequence of counting numbers, a sequence of prime numbers, a Fibonacci sequence of numbers, a sequence of perfect square numbers, Recamán's number sequence, or a Catalan number sequence; wherein the first property comprises one of: an identity of the first number, an order of magnitude, divisibility of the first number by a second number, whether the first number is prime, whether the first number is odd, or whether the first number is even; receive an input vector comprising data representing at least the first number; perform a forward pass using the artificial neural network and the input vector, wherein the artificial neural network comprises a hidden layer, and wherein the internal representation of the portion of the artificial neural network comprises one or more values associated with the hidden layer determined during the forward pass; wherein the artificial neural network comprises a plurality of layers and a set of weights, wherein the set of weights is applied to values of a first layer of the plurality of layers during a forward pass to produce a set of values, wherein the set of values is passed to a second layer of the plurality of layers during the forward pass, and wherein the internal representation comprises the set of weights.

Another aspect of the disclosure provides a computer-implemented method executed under control of a computing system comprising a computer processor configured to execute specific instructions. The computer-implemented method includes: obtaining number sequence data representing one or more sequences of numbers; training a number prediction machine learning model using the number sequence data, wherein the number prediction machine learning model generates output representing a next number in a number sequence based at least partly on input representing a number in the number sequence; obtaining, from the number prediction machine learning model, internal representation data associated with a set of numbers, wherein a first portion of the internal representation data comprises an internal representation of the number prediction machine learning model generated based at least partly on a first number of the set of numbers; and generating a plurality of number embeddings from the internal representation data, wherein a number embedding of the plurality of number embeddings comprises a multi-element representation of the first number.

The computer-implemented method of the preceding paragraph can include any sub-combination of the following features: wherein obtaining the internal representation data comprises obtaining a set of weights, wherein the number prediction machine learning model comprises an artificial neural network with a plurality of layers, wherein the set of weights is applied to values of a first layer of the plurality of layers during a forward pass to produce a set of values, and wherein the set of values is passed to a second layer of the plurality of layers during the forward pass; wherein generating the plurality of number embeddings comprises generating a vector of real numbers, wherein the multi-element representation of the first number comprises the vector of real numbers; receiving an input vector comprising data representing at least the first number; performing a forward pass using the number prediction machine learning model, wherein the number prediction machine learning model comprises an artificial neural network, and wherein the internal representation of the portion of the artificial neural network comprises one or more values associated with a hidden layer determined during the forward pass; generating a first subset of the multi-element representation, wherein the first subset is associated with a first property of the first number; generating a second subset of the multi-element representation, wherein the second subset is associated with a second property of the first number, and wherein the second property is different than the first property; determining a cosine distance using at least two number embeddings of the plurality of number embeddings; generating output based at least partly on the cosine distance, wherein the output represents on of: a numeric analogy, a sequence completion task, or a set expansion task; iteratively generating a plurality of machine learning probes using different sets of elements of the plurality of number embeddings, wherein a first set of elements comprises a different quantity of elements than a second set of elements, and wherein the first set of elements comprises a same quantity of elements as a third set of elements.

A further aspect of the disclosure provides a system comprising a computer-readable memory storing executable instructions, and one or more processors in communication with the computer readable memory. The one or more processors are programmed by the executable instructions to: obtain number sequence data representing one or more sequences of numbers; train a number prediction machine learning model using the number sequence data, wherein the number prediction machine learning model generates output representing a next number in a number sequence based at least partly on input representing a number in the number sequence; obtain, from the number prediction machine learning model, internal representation data associated with a set of numbers, wherein a first portion of the internal representation data comprises an internal representation of the number prediction machine learning model generated based at least partly on a first number of the set of numbers; and generate a plurality of number embeddings from the internal representation data, wherein a number embedding of the plurality of number embeddings comprises a multi-element representation of the first number.

The system of the preceding paragraph can include any sub-combination of the following features: wherein the internal representation data comprises a set of weights, wherein the number prediction machine learning model comprises an artificial neural network with a plurality of layers, wherein the set of weights is applied to values of a first layer of the plurality of layers during a forward pass to produce a set of values, and wherein the set of values is passed to a second layer of the plurality of layers during the forward pass; wherein to generate the plurality of number embeddings, the one or more processors are programmed by further executable instructions to generate a vector of real numbers, wherein the multi-element representation of the first number comprises the vector of real numbers; receive an input vector comprising data representing at least the first number; perform a forward pass using the number prediction machine learning model, wherein the number prediction machine learning model comprises an artificial neural network, and wherein the internal representation of the portion of the artificial neural network comprises one or more values associated with a hidden layer determined during the forward pass; generate a first subset of the multi-element representation, wherein the first subset is associated with a first property of the first number; generate a second subset of the multi-element representation, wherein the second subset is associated with a second property of the first number, wherein the second property is different than the first property; determine a cosine distance using at least two number embeddings of the plurality of number embeddings; generate output based at least partly on the cosine distance, wherein the output represents on of: a numeric analogy, a sequence completion task, or a set expansion task; iteratively generate a plurality of machine learning probes using different sets of elements of the plurality of number embeddings, wherein a first set of elements comprises a different quantity of elements than a second set of elements, and wherein the first set of elements comprises a same quantity of elements as a third set of elements.

Yet another aspect of the disclosure provides a system comprising a computer-readable memory storing executable instructions, and one or more processors in communication with the computer readable memory. The one or more processors are programmed by the executable instructions to: obtain a plurality of number embeddings, wherein a number embedding comprises a multi-element representation of a number; generate probe training data using the plurality of number embeddings, wherein the probe training data comprises labeled training data input items, wherein a label represents a numeric property classification to be determined from one or more elements of a corresponding number embedding; train a first machine learning probe using a first portion of the probe training data to perform numeric property classification, wherein the first machine learning probe is trained using a first set of one or more elements of each number embedding in the first portion of the probe training data; evaluate a first performance metric associated with the first machine learning probe based at least partly on a second portion of the probe training data; train a second machine learning probe using the first portion of the probe training data to perform numeric property classification, wherein the second machine learning probe is trained using a second set of one or more elements of each number embedding in the first portion of the probe training data, and wherein the second set of one or more elements is different than the first set of one or more elements; evaluate a second performance metric associated with the second machine learning probe based at least partly on the second portion of the probe training data; and select the second machine learning probe based at least partly on an analysis of the first performance emetic and the second performance metric.

The system of the preceding paragraph can include any sub-combination of the following features: wherein the first set of one or more elements comprises at least one element in the second set of one or more elements; iteratively generate a plurality of machine learning probes using a plurality of different sets of one or more elements of the number embeddings, wherein the first set of one or more elements comprises a different quantity of elements than the second set of one or more elements, and wherein the first set of one or more elements comprises a same quantity of elements as a third set of the plurality of different sets of one or more elements; wherein to evaluate the first performance metric, the one or more processors are programmed by further executable instructions to determine one of an accuracy or a Pearson correlation; wherein the first machine learning probe comprises one of: a logistic regression model, a multi-class support vector classification model, or a linear regression model; wherein the numeric property classification corresponds to one of: an identity, an order of magnitude, divisibility by a particular number, primness, oddness, or evenness.

Another aspect of the disclosure provides a computer-implemented method executed under control of a computing system comprising a computer processor configured to execute specific instructions. The computer-implemented method includes: obtaining a set of number embeddings corresponding to a set of numbers, wherein a number embedding of the set of number embeddings comprises a multi-element representation of a number of the set of numbers; generating first probe results based at least partly on classification of a first subset of elements of individual number embeddings of the set of number embeddings into one or more numeric property classifications using a first machine learning probe; generating second probe results based at least partly on classification of a second subset of elements of individual number embeddings of the set of number embeddings into the one or more numeric property classifications using a second machine learning probe; and selecting the first machine learning probe based at least partly on an analysis of the first probe results with respect to the second probe results.

The computer-implemented method of the preceding paragraph can include any sub-combination of the following features: wherein selecting the first machine learning probe based at least partly on the analysis of the first probe results with respect to the second probe results comprises selecting the first machine learning probe based on accuracy in generating a numeric property classification corresponding to one of: an identity, an order of magnitude, divisibility by a particular number, primness, oddness, or evenness; training the first machine learning probe using a first set of one or more elements of each number embedding in a first portion of probe training data; evaluating a first performance metric associated with the first machine learning probe based at least partly on a second portion of the probe training data, wherein generating the first probe results comprises generating the first probe results based on evaluating the first performance metric; training the second machine learning probe using a second set of one or more elements of each number embedding in the first portion of probe training data; iteratively generating a plurality of machine learning probes using a plurality of different subsets of one or more elements of the number embeddings, wherein the first subset of elements comprises a different quantity of elements than the second subset of elements, and wherein the first subset of elements comprises a same quantity of elements as a third subset of elements; training a number prediction machine learning model using number sequence data representing a sequence of numbers; obtaining, from the number prediction machine learning model, internal representation data associated with the set of numbers, wherein a first portion of the internal representation data comprises an internal representation of the number prediction machine learning model generated based at least partly on a first number of the set of numbers; generating the set of number embeddings from the internal representation data.

A further aspect of the disclosure provides a system comprising a computer-readable memory storing executable instructions, and one or more processors in communication with the computer readable memory. The one or more processors are programmed by the executable instructions to: obtain a set of number embeddings corresponding to a set of numbers, wherein a number embedding of the set of number embeddings comprises a multi-element representation of a number of the set of numbers; generate first probe results based at least partly on classification of a first subset of elements of individual number embeddings of the set of number embeddings into one or more numeric property classifications using a first machine learning probe; generate second probe results based at least partly on classification of a second subset of elements of individual number embeddings of the set of number embeddings into the one or more numeric property classifications using a second machine learning probe; and select the first machine learning probe based at least partly on an analysis of the first probe results with respect to the second probe results.

The system of the preceding paragraph can include any sub-combination of the following features: wherein to select the first machine learning probe based at least partly on the analysis of the first probe results with respect to the second probe results, the one or more computing devices are configured by further executable instructions to select the first machine learning probe based on accuracy in generating a numeric property classification corresponding to one of: an identity, an order of magnitude, divisibility by a particular number, primness, oddness, or evenness; train the first machine learning probe using a first set of one or more elements of each number embedding in a first portion of probe training data; evaluate a first performance metric associated with the first machine learning probe based at least partly on a second portion of the probe training data, wherein generating the first probe results comprises generating the first probe results based on evaluating the first performance metric; train the second machine learning probe using a second set of one or more elements of each number embedding in the first portion of probe training data; iteratively generate a plurality of machine learning probes using a plurality of different subsets of one or more elements of the number embeddings, wherein the first subset of elements comprises a different quantity of elements than the second subset of elements, and wherein the first subset of elements comprises a same quantity of elements as a third subset of elements; train a number prediction machine learning model using number sequence data representing a sequence of numbers; obtain, from the number prediction machine learning model, internal representation data associated with the set of numbers, wherein a first portion of the internal representation data comprises an internal representation of the number prediction machine learning model generated based at least partly on a first number of the set of numbers; generate the set of number embeddings from the internal representation data.

Yet another aspect of the disclosure provides a system comprising a computer-readable memory storing a set of number embeddings corresponding to a set of integers, wherein a number embedding of the set of number embeddings comprises a multi-dimension vector representing an integer of the set of integers, and wherein individual dimensions of the multi-dimension vector comprise non-integer real values; and one or more processors in communication with the computer readable memory. The one or more processors are programmed by the executable instructions to: generate a first user interface comprising one or more numeric entry fields and one or more operation entry fields; receive, via the first user interface, number data and operation data, wherein the operation data represents an analysis to be performed with respect to at least a portion of a plurality of numbers in the number data; determine, for each of the numbers in the number data, a corresponding number embedding of the set of number embeddings; determine a similarity metric of at least a first number embedding with respect to at least a second number embedding, wherein the first number embedding corresponds to a first number in the number data, and wherein the second number embedding corresponds to a second number in the number data; identify, based at least partly on the similarity metric and the operation data, a third number embedding of the set of number embeddings; and generate a second user interface comprising a result display area, wherein the result display area presents at least a number corresponding to the third number embedding.

The system of the preceding paragraph can include any sub-combination of the following features: wherein to determine the similarity metric, the one or more processors are further configured to at least determine a cosine distance using the first number embedding and the second number embedding; wherein to determine the similarity metric, the one or more processors are further configured to at least analyze the first number embedding and the second number embedding with a number embedding probe, wherein the number embedding probe is configured to generate classification output from a subset of dimensions a multi-dimension number embedding vector; wherein the analysis to be performed comprises a fraud-detection analysis; wherein the operation data represents at least one of: a numeric analogy, a sequence completion task, or a set expansion task.

Another aspect of the disclosure provides a computer-implemented method executed under control of a computing system comprising a computer processor configured to execute specific instructions. The computer-implemented method includes: receiving, from a computing device, a request to perform an operation with respect to a plurality of numbers; determining a similarity metric using at least a first number embedding and a second number embedding of a plurality of number embeddings, wherein each number embedding of a subset of the plurality of number embeddings comprises a multi-element representation of a corresponding number of the plurality of numbers; identifying a third number embedding of the plurality of number embeddings based at least partly on the similarity metric and the operation; and generating a response to the request, the response comprising at least a number corresponding to the third number embedding.

The computer-implemented method of the preceding paragraph can include any sub-combination of the following features: obtaining the subset of the plurality of number embeddings, wherein the first number embedding comprises a multi-dimension vector of real numbers; wherein determining the similarity metric comprises determining a cosine distance using the first number embedding and the second number embedding; analyzing the first number embedding and the second number embedding with a number embedding probe, wherein the number embedding probe is configured to generate classification output from a subset of dimensions a multi-dimension number embedding vector; wherein determining the similarity metric is based at least partly on the classification output; wherein identifying the third number embedding based at least partly on the similarity metric and the operation comprises identifying the third number embedding as being associated with a number in one of: a sequence comprising the plurality of numbers, or a set comprising the plurality of numbers; determining that at least one of the first number embedding or the second number embedding are associated with a fraudulent number; causing presentation of a graphical user interface comprising one or more numeric entry fields and one or more operation entry fields, wherein the request is received via the user interface; training a number prediction machine learning model using number sequence data representing a sequence of numbers; obtaining, from the number prediction machine learning model, internal representation data associated with a set of numbers, wherein a first portion of the internal representation data comprises an internal representation of the number prediction machine learning model generated based at least partly on a first number of the set of numbers; generating the plurality of number embeddings from the internal representation data.

A further aspect of the disclosure provides a system comprising a computer-readable memory storing executable instructions, and one or more processors in communication with the computer readable memory. The one or more processors are programmed by the executable instructions to: receive, from a computing device, a request to perform an operation with respect to a plurality of numbers; determine a similarity metric using at least a first number embedding and a second number embedding of a plurality of number embeddings, wherein each number embedding of a subset of the plurality of number embeddings comprises a multi-element representation of a corresponding number of the plurality of numbers; identify a third number embedding of the plurality of number embeddings based at least partly on the similarity metric and the operation; and generate a response to the request, the response comprising at least a number corresponding to the third number embedding.

The system of the preceding paragraph can include any sub-combination of the following features: wherein the first number embedding comprises a multi-dimension vector of real numbers; wherein to determine the similarity metric, the one or more processors are programmed by further executable instructions to determine a cosine distance using the first number embedding and the second number embedding; analyze to the first number embedding and the second number embedding with a number embedding probe, wherein the number embedding probe is configured to generate classification output from a subset of dimensions a multi-dimension number embedding vector, and wherein the similarity metric is based at least partly on the classification output; wherein to identify the third number embedding based at least partly on the similarity metric and the operation, the one or more processor are programmed by further executable instructions to identify the third number embedding as being associated with a number in one of: a sequence comprising the plurality of numbers, or a set comprising the plurality of numbers; train a number prediction machine learning model using number sequence data representing a sequence of numbers; obtain, from the number prediction machine learning model, internal representation data associated with a set of numbers, wherein a first portion of the internal representation data comprises an internal representation of the number prediction machine learning model generated based at least partly on a first number of the set of numbers; generate the plurality of number embeddings from the internal representation data.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system comprising:
    computer-readable memory storing a set of number embeddings corresponding to a set of integers, wherein a number embedding of the set of number embeddings comprises a multi-dimension vector representing an integer of the set of integers, and wherein individual dimensions of the multi-dimension vector comprise non-integer real values; and
    one or more processors in communication with the computer readable memory and configured to at least:
        generate a first user interface comprising one or more numeric entry fields and one or more operation entry fields;
        receive, via the first user interface, number data and operation data, wherein the operation data represents an analysis to be performed with respect to at least a portion of a plurality of numbers in the number data;
        determine, for each of the numbers in the number data, a corresponding number embedding of the set of number embeddings;
        determine a similarity metric of at least a first number embedding with respect to at least a second number embedding, wherein the first number embedding corresponds to a first number in the number data, and wherein the second number embedding corresponds to a second number in the number data;
        identify, based at least partly on the similarity metric and the operation data, a third number embedding of the set of number embeddings; and
        generate a second user interface comprising a result display area, wherein the result display area presents at least a number corresponding to the third number embedding.

2. The system of claim 1, wherein to determine the similarity metric, the one or more processors are further configured to at least determine a cosine distance using the first number embedding and the second number embedding.

3. The system of claim 1, wherein to determine the similarity metric, the one or more processors are further configured to at least analyze the first number embedding and the second number embedding with a number embedding probe, wherein the number embedding probe is configured to generate classification output from a subset of dimensions a multi-dimension number embedding vector.

4. The system of claim 1, wherein the analysis to be performed comprises a fraud-detection analysis.

5. The system of claim 1, wherein the operation data represents at least one of: a numeric analogy, a sequence completion task, or a set expansion task.

6. A computer-implemented method comprising:
    under control of a computing system comprising a computer processor configured with executable instructions,
        receiving, from a computing device, a request to perform an operation with respect to a plurality of numbers;
        determining a similarity metric using at least a first number embedding and a second number embedding of a plurality of number embeddings, wherein each number embedding of a subset of the plurality of number embeddings comprises a multi-element representation of a corresponding number of the plurality of numbers;
        identifying a third number embedding of the plurality of number embeddings based at least partly on the similarity metric and the operation; and
        generating a response to the request, the response comprising at least a number corresponding to the third number embedding.

7. The computer-implemented method of claim 6, further comprising obtaining the subset of the plurality of number embeddings, wherein the first number embedding comprises a multi-dimension vector of real numbers.

8. The computer-implemented method of claim 6, wherein determining the similarity metric comprises determining a cosine distance using the first number embedding and the second number embedding.

9. The computer-implemented method of claim 6, further comprising analyzing the first number embedding and the second number embedding with a number embedding probe, wherein the number embedding probe is configured to generate classification output from a subset of dimensions a multi-dimension number embedding vector.

10. The computer-implemented method of claim 9, wherein determining the similarity metric is based at least partly on the classification output.

11. The computer-implemented method of claim 6, wherein identifying the third number embedding based at least partly on the similarity metric and the operation comprises identifying the third number embedding as being associated with a number in one of: a sequence comprising the plurality of numbers, or a set comprising the plurality of numbers.

12. The computer-implemented method of claim 6, further comprising determining that at least one of the first number embedding or the second number embedding are associated with a fraudulent number.

13. The computer-implemented method of claim 6, further comprising causing presentation of a graphical user interface comprising one or more numeric entry fields and one or more operation entry fields, wherein the request is received via the graphical user interface.

14. The computer-implemented method of claim 6, further comprising:
    training a number prediction machine learning model using number sequence data representing a sequence of numbers;
    obtaining, from the number prediction machine learning model, internal representation data associated with a set of numbers, wherein a first portion of the internal representation data comprises an internal representation of the number prediction machine learning model generated based at least partly on a first number of the set of numbers; and generating the plurality of number embeddings from the internal representation data.

15. A system comprising:

computer-readable memory storing executable instructions; and one or more processors programmed by the executable instructions to:

receive, from a computing device, a request to perform an operation with respect to a plurality of numbers;

determine a similarity metric using at least a first number embedding and a second number embedding of a plurality of number embeddings, wherein each number embedding of a subset of the plurality of number embeddings comprises a multi-element representation of a corresponding number of the plurality of numbers;

identify a third number embedding of the plurality of number embeddings based at least partly on the similarity metric and the operation; and generate a response to the request, the response comprising at least a number corresponding to the third number embedding.

16. The system of claim 15, wherein the first number embedding comprises a multi-dimension vector of real numbers.

17. The system of claim 15, wherein to determine the similarity metric, the one or more processors are programmed by further executable instructions to determine a cosine distance using the first number embedding and the second number embedding.

18. The system of claim 15, wherein the one or more processors are programmed by further executable instructions to analyze to the first number embedding and the second number embedding with a number embedding probe, wherein the number embedding probe is configured to generate classification output from a subset of dimensions a multi-dimension number embedding vector, and wherein the similarity metric is based at least partly on the classification output.

19. The system of claim 15, wherein to identify the third number embedding based at least partly on the similarity metric and the operation, the one or more processors are programmed by further executable instructions to identify the third number embedding as being associated with a number in one of: a sequence comprising the plurality of numbers, or a set comprising the plurality of numbers.

20. The system of claim 15, wherein the one or more processors are programmed by further executable instructions to:

train a number prediction machine learning model using number sequence data representing a sequence of numbers;

obtain, from the number prediction machine learning model, internal representation data associated with a set of numbers, wherein a first portion of the internal representation data comprises an internal representation of the number prediction machine learning model generated based at least partly on a first number of the set of numbers; and generate the plurality of number embeddings from the internal representation data.

\* \* \* \* \*